Oct. 19, 1954  M. J. WATSON  2,692,090
CONDENSER WINDING MACHINE
Filed May 18, 1949  15 Sheets—Sheet 1

Inventor:
Menard J. Watson
By: Clarence J. Loftus
Atty.

Oct. 19, 1954  M. J. WATSON  2,692,090
CONDENSER WINDING MACHINE
Filed May 18, 1949  15 Sheets-Sheet 3

Inventor:
Menard J. Watson
By: Clarence J. Loftus
Atty.

Oct. 19, 1954

M. J. WATSON 2,692,090

CONDENSER WINDING MACHINE

Filed May 18, 1949

Inventor:
Menard J. Watson
By: Clarence J. Loftus
Atty.

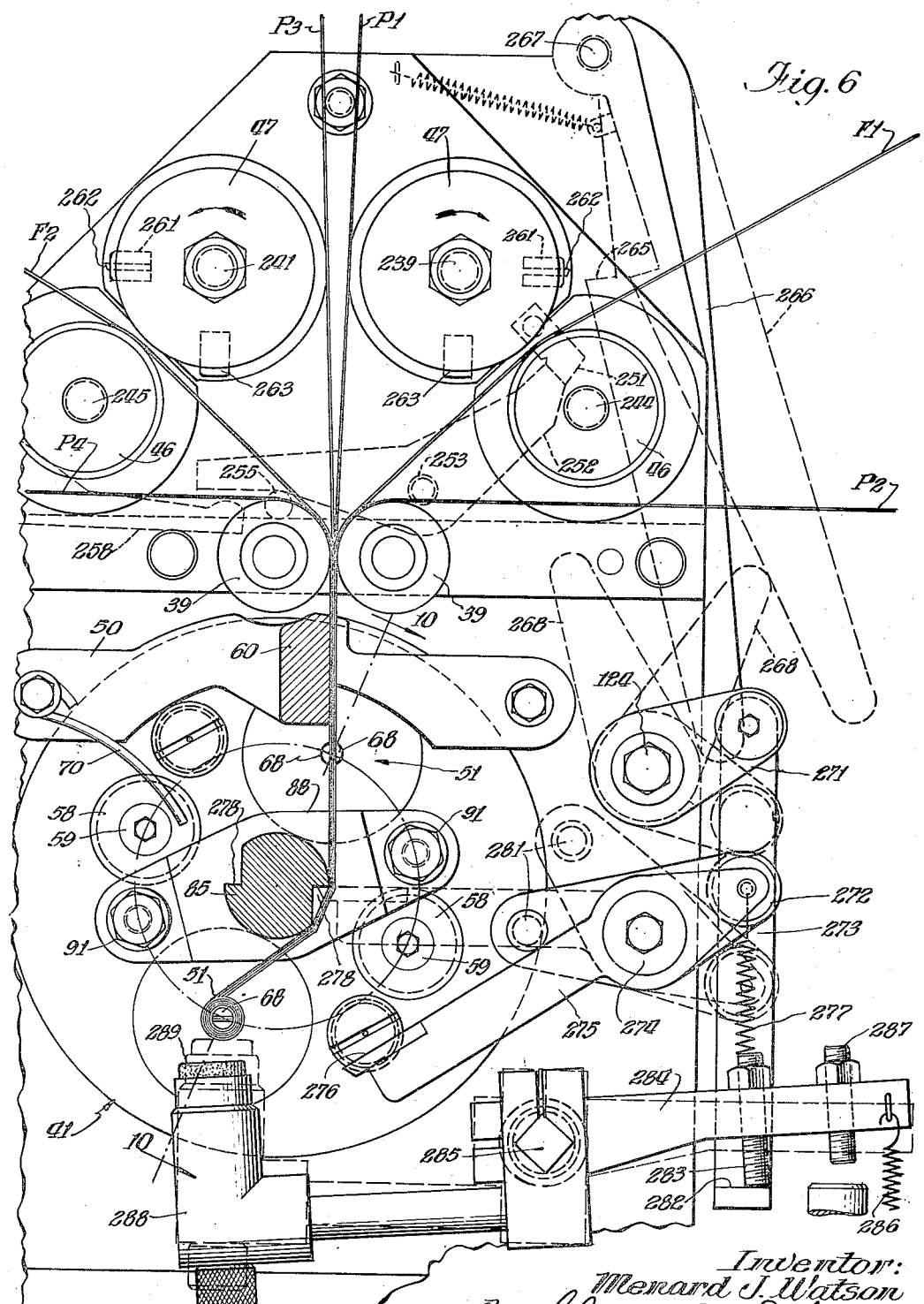

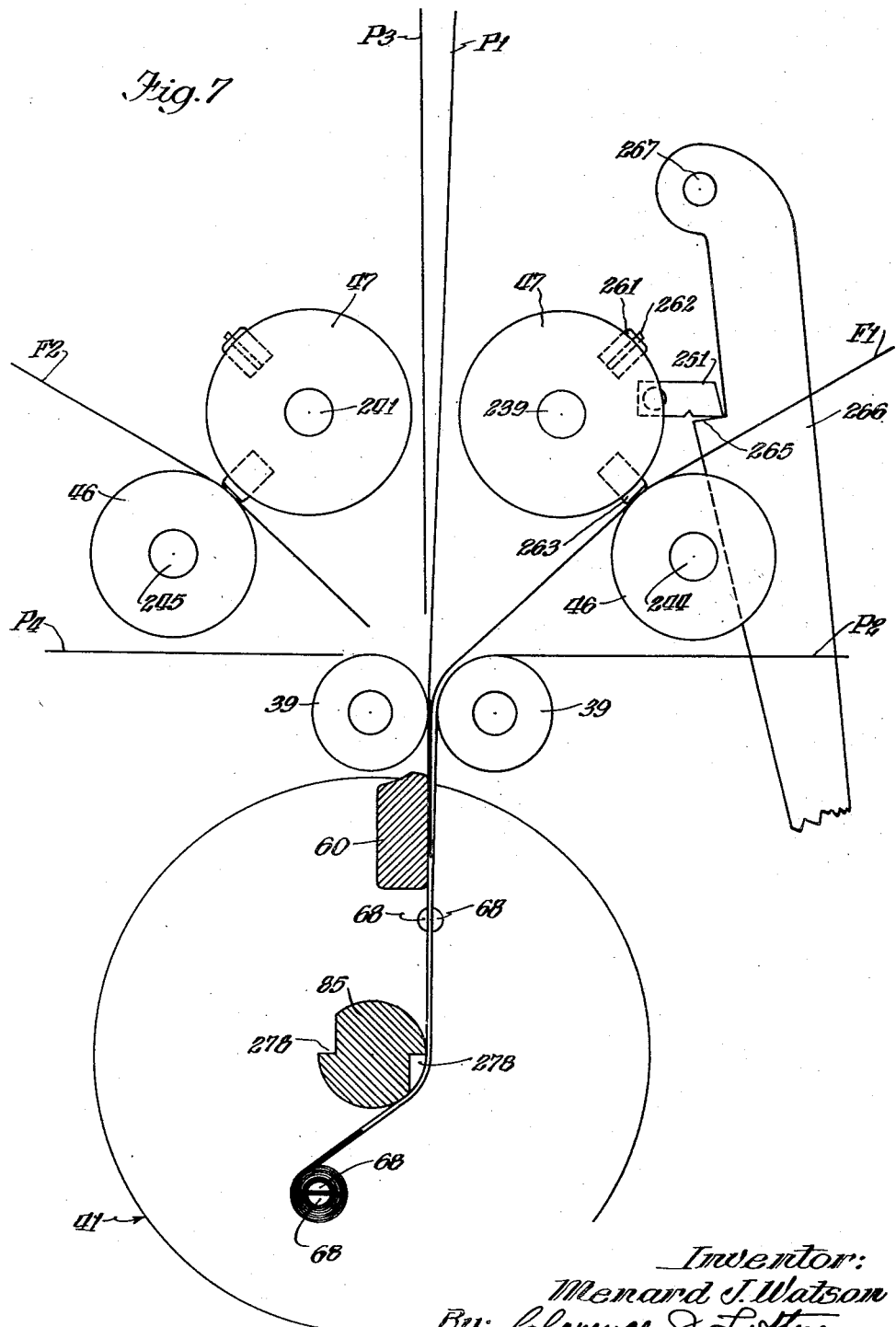

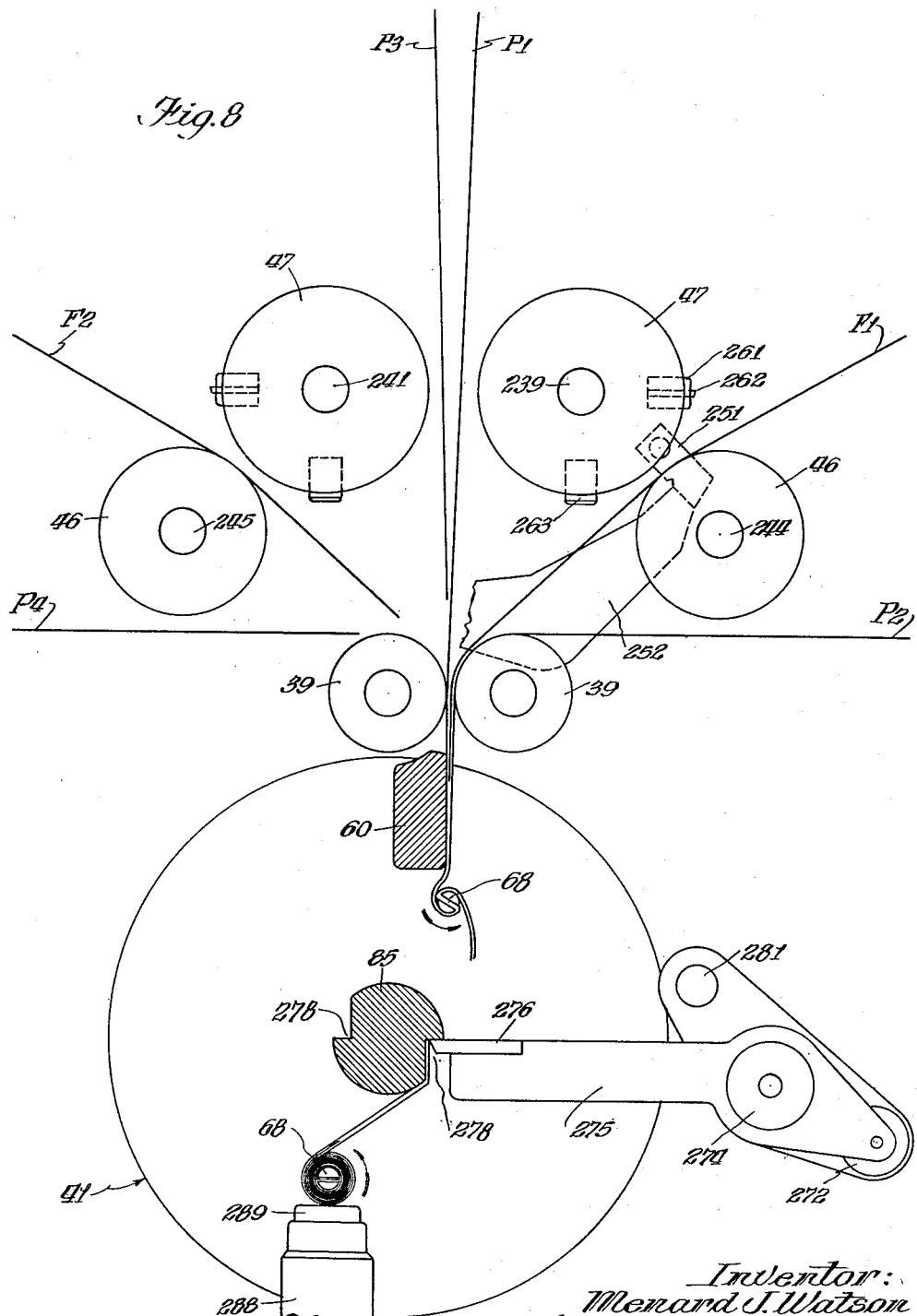

Oct. 19, 1954  M. J. WATSON  2,692,090
CONDENSER WINDING MACHINE
Filed May 18, 1949  15 Sheets-Sheet 9
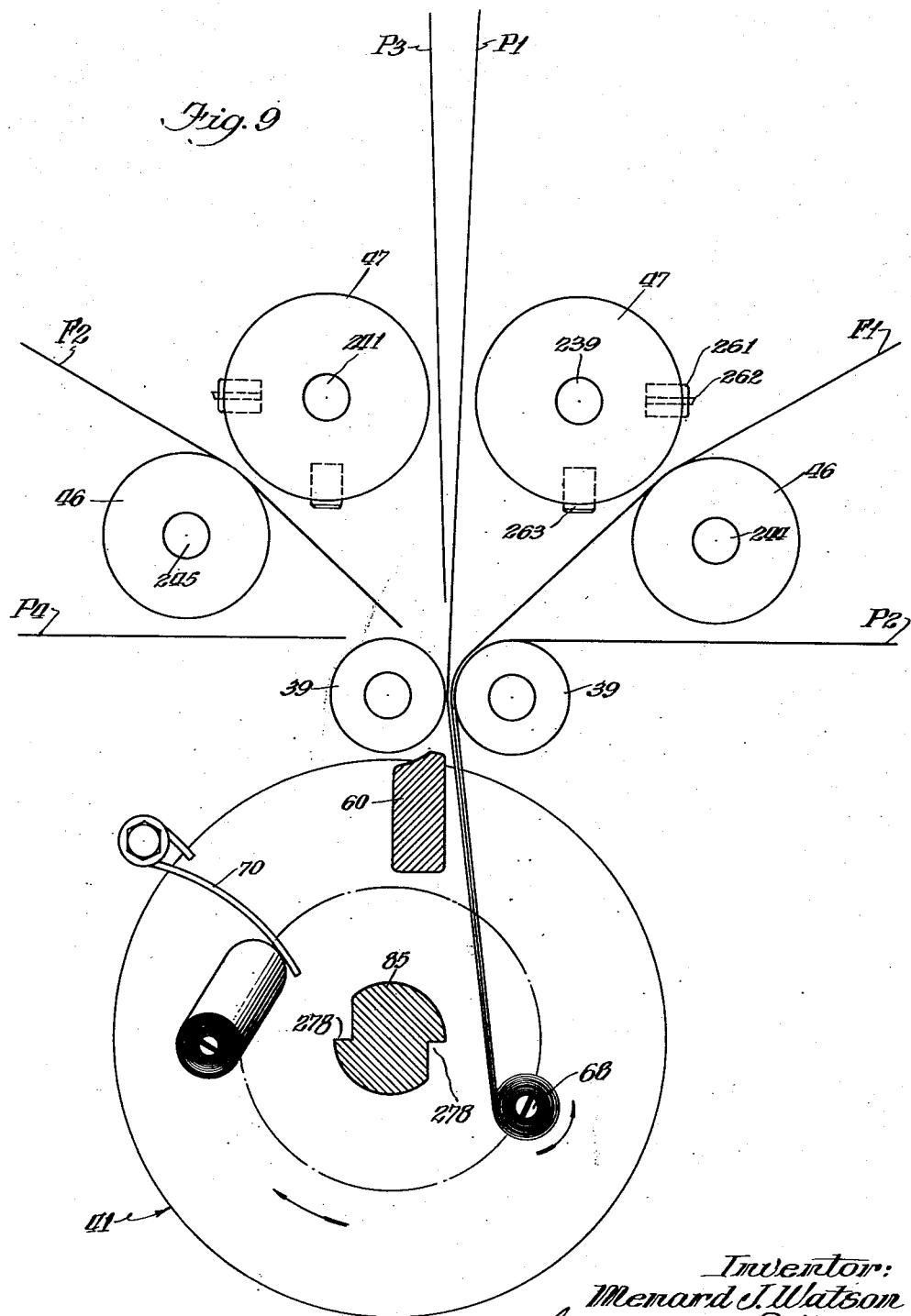

Oct. 19, 1954
M. J. WATSON
2,692,090
CONDENSER WINDING MACHINE
Filed May 18, 1949
15 Sheets-Sheet 10
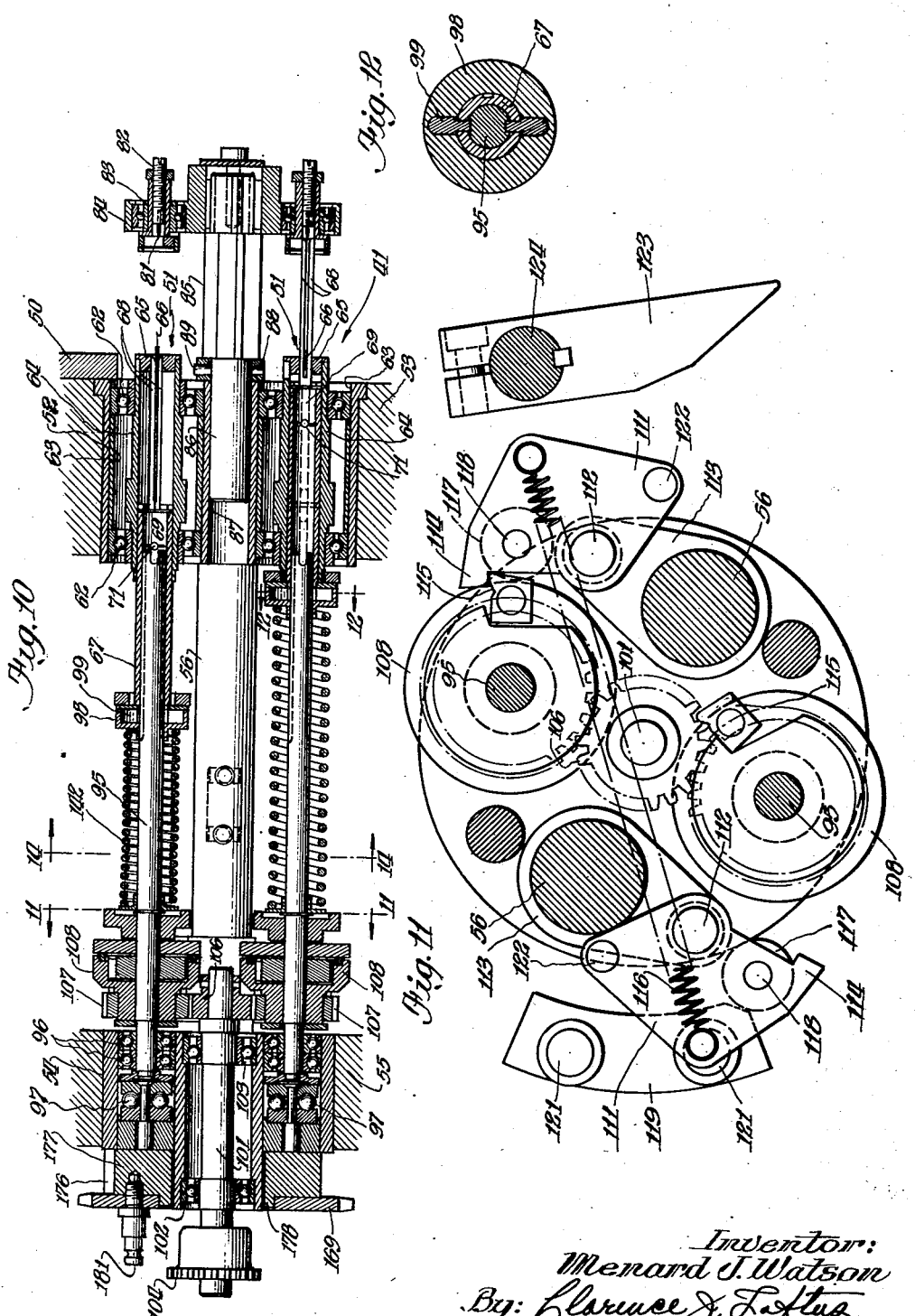
Inventor:
Menard J. Watson
By: Clarence J. Loftus
atty

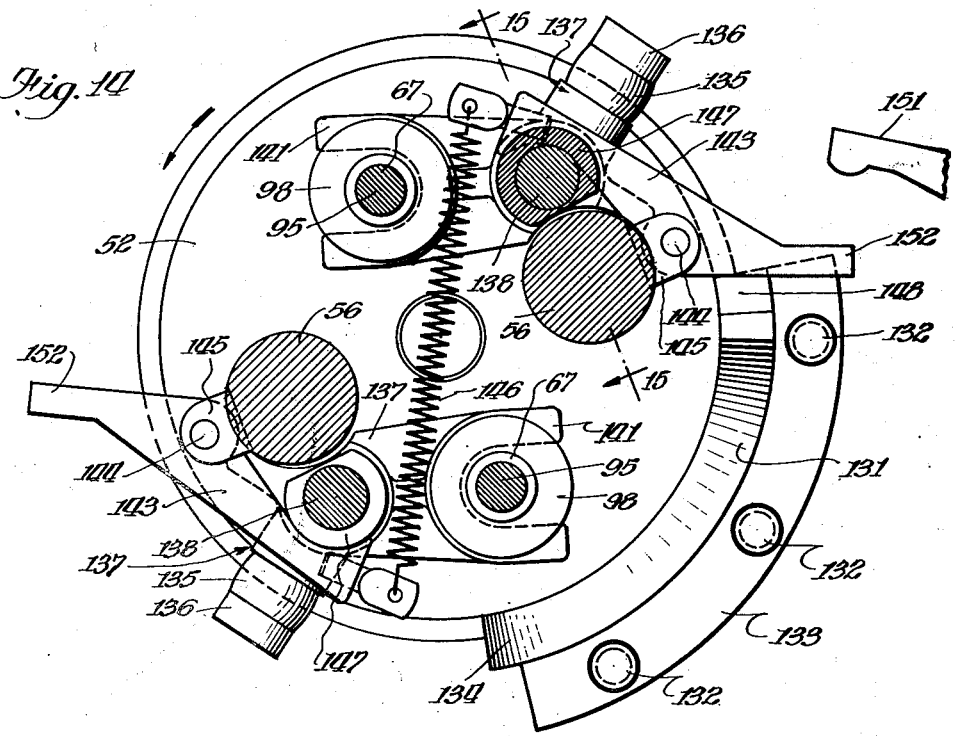

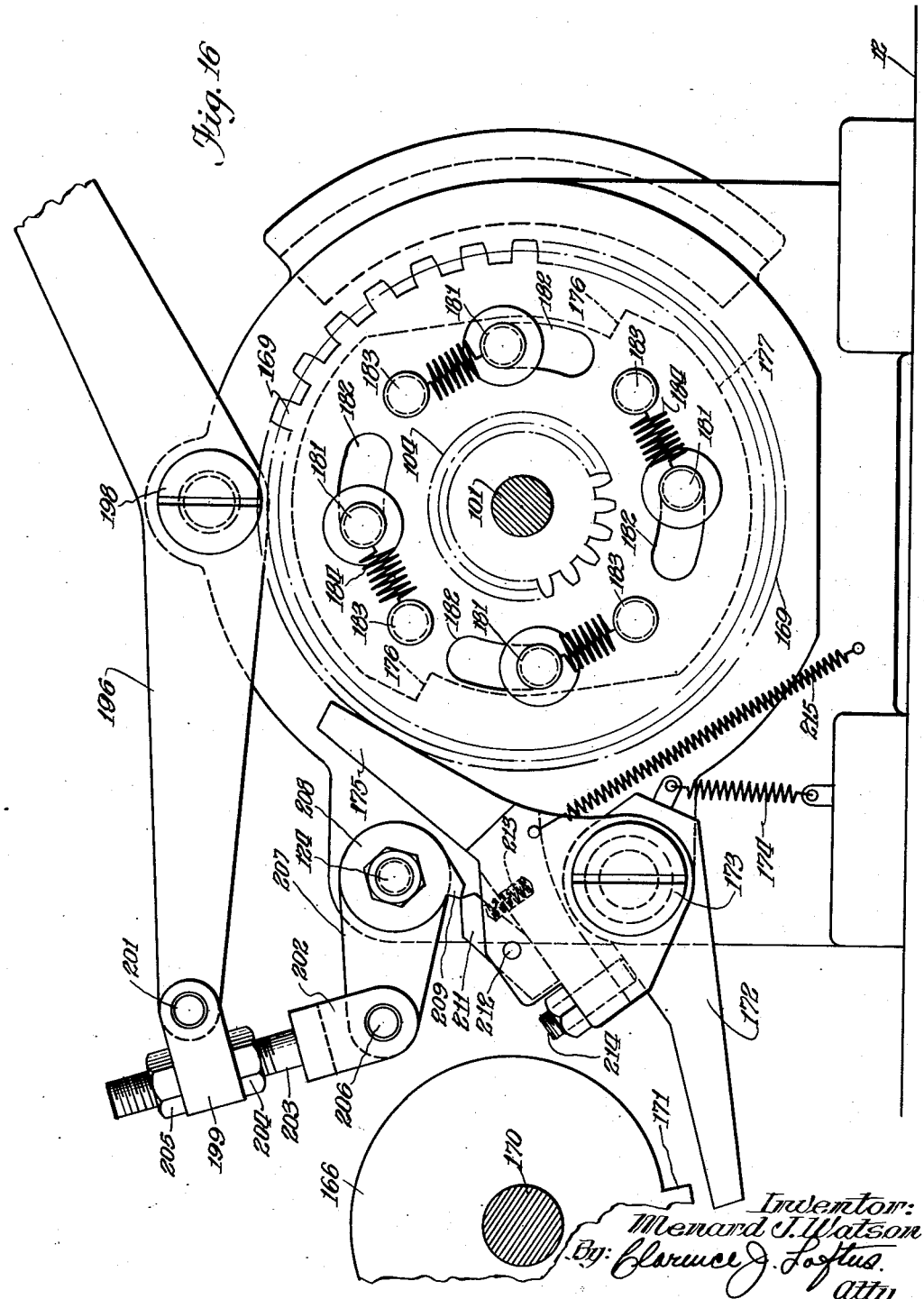

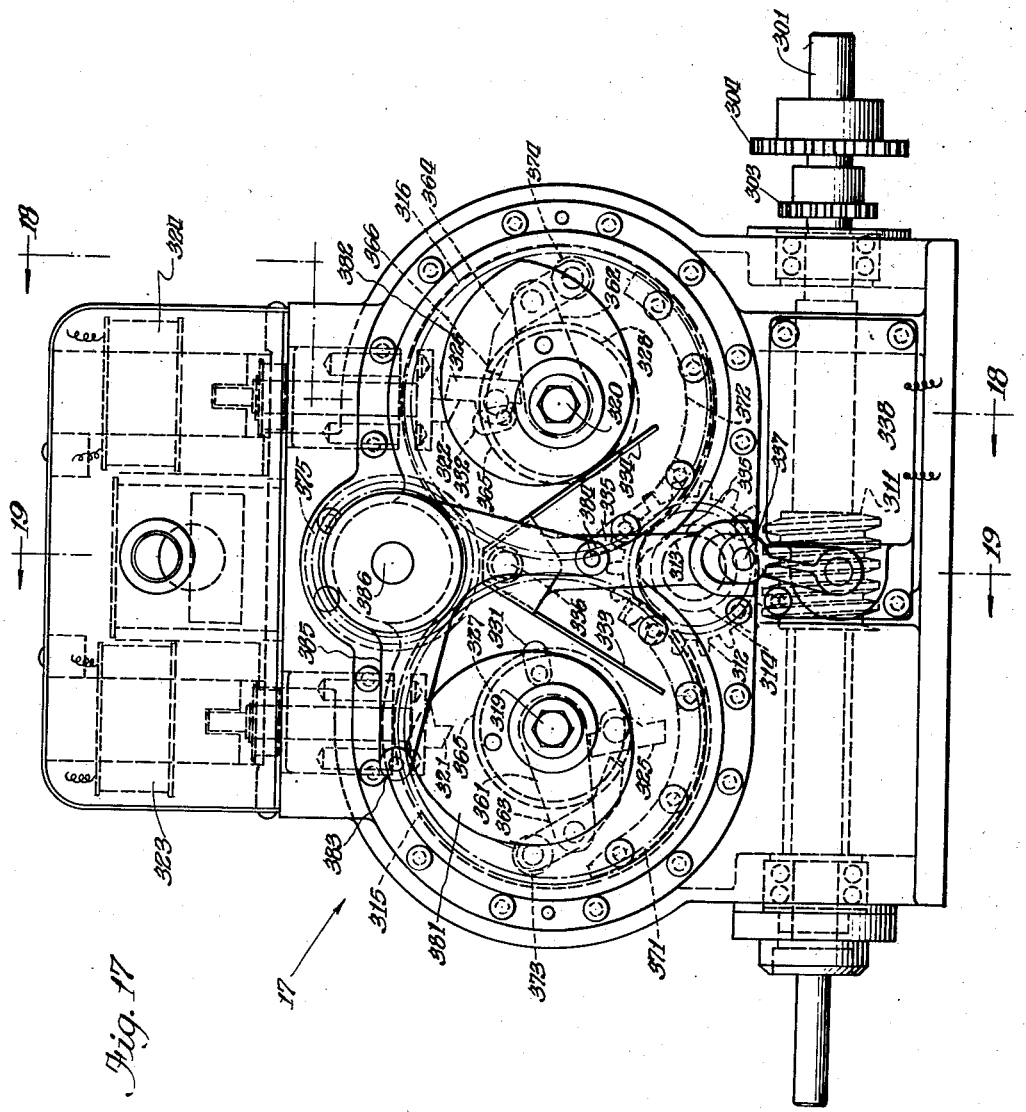

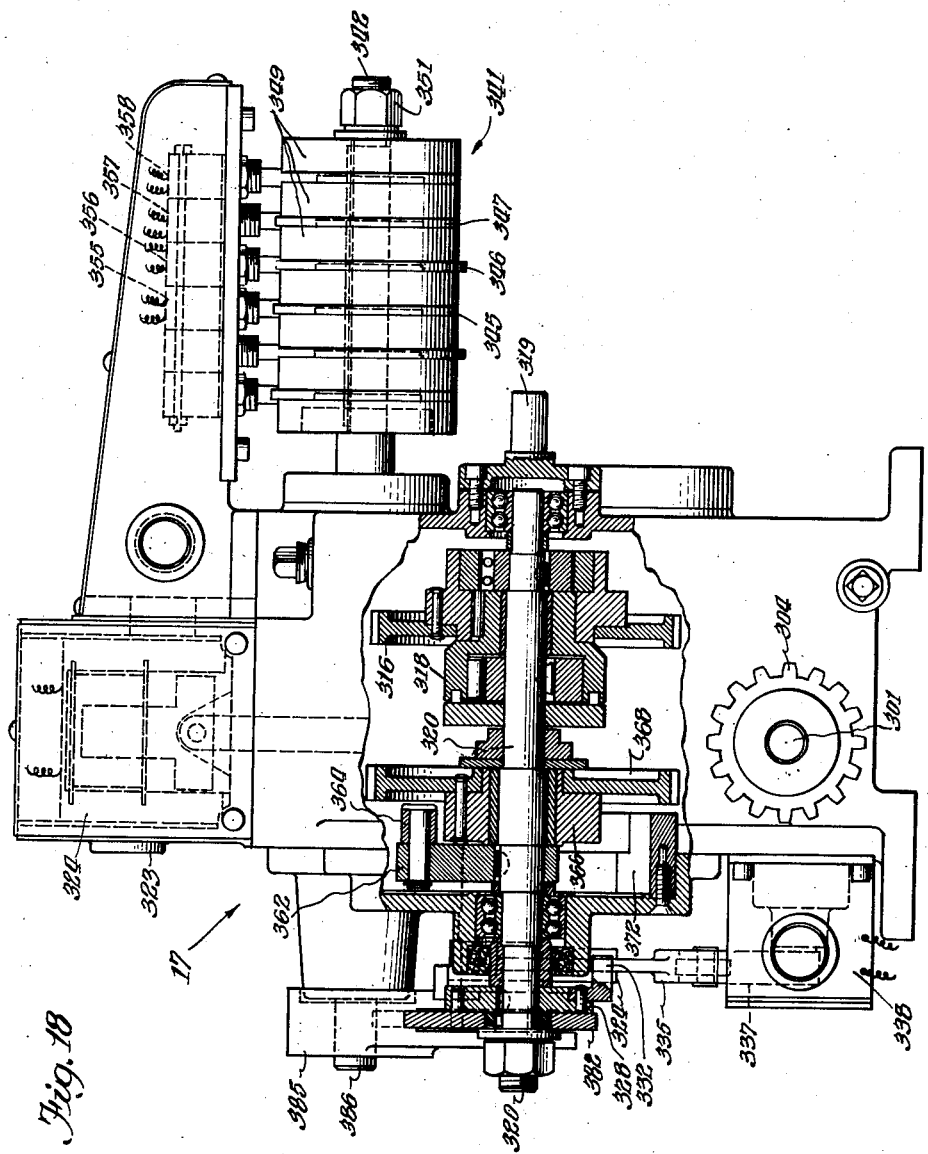

Oct. 19, 1954

M. J. WATSON 2,692,090

CONDENSER WINDING MACHINE

Filed May 18, 1949

Inventor:
Menard J. Watson
By: Clarence J. Loftus
atty.

UNITED STATES PATENT OFFICE 2,692,090

CONDENSER WINDING MACHINE

Menard J. Watson, Aux Sable Township, Grundy County, Ill., assignor to Solar Manufacturing Corporation, Chicago, Ill.

Application May 18, 1949, Serial No. 93,991

13 Claims. (Cl. 242—56)

The present invention relates to condenser winding machines and is specifically directed to the provision of an automatic, high-speed production machine for winding condensers of the coiled foil and paper type.

As conducive to a clear understanding of the invention, it is noted that a condenser winding machine of the above type is normally entirely automatic in operation and should require no attention other than the replacement of the reels of paper and foil when exhausted, where a single mechanical failure, such as the breaking of one of the strips of foil, goes unnoticed for a long period of time, an utterly worthless product may be produced with resultant serious loss of material and time.

Where automatic winding mechanisms also are not adjustable to produce various sizes and capacities of condensers as required, and lack uniformity in the completed product, the machine is not flexible in operation and since condensers are acceptable in the trade only if held to quite close limits of tolerance as to capacity, any uncontrolled capacity deviation may so radically alter the capacity of the finished condensers that they fail to meet specifications and are worthless.

It is accordingly among the objects of the invention to provide a condenser winding machine wherein the mechanisms utilized to feed the strips of foil and dielectric material to the winding arbor are capable of handling this fragile material at unusually high speed, yet without imposing strains on the sheets nor allowing them to become entangled, which machine will operate over long periods of time without likelihood of mechanical failure and with assurance that the resultant products produced will be entirely uniform, and which may readily be adjusted to produce various sizes and capacities of condensers as desired.

Where the condenser web is not maintained under constant tension and is moved forwardly by a stepping or intermittent motion, the foil strip is likely to break upon the impact due to such intermittent motion. Where there is a period of idleness after the winding of one condenser and before the winding of the next, the machine is not efficient in operation.

Another object of the invention is to provide a machine of the above type in which the condenser web is maintained continuously under a light tension and is moved forwardly in a substantially constant motion and in which there is no period of idleness during winding of successive condensers with resultant efficient operation of the machine.

Another object of the invention is the provision of a machine having the characteristics described above, together with an automatic speed control mechanism so designed that the winding arbor rotates at the fastest practicable speed at all times; with the rate of acceleration and deceleration controlled according to a scientifically determined speed curve at which the most successful operation of the device is attained, yet with the mechanism so arranged as to maintain the optimum conditions of acceleration and deceleration with either small or large capacity condensers.

According to the invention the condenser winding machine includes a foil and paper supply adapted to feed strips of metal foil into interleaved relationship with strips of dielectric material and to transfer the web thus formed successively to either of the two winding arbors on which a coil of the web will be wound. The arbors of the machine work as a pair, but are located on opposite stations of a rotatable turret; so that the winding of one arbor progresses as the turret turns to carry the arbor in orbital movement to the opposite station. As the arbor reaches the second station a taut span of the foil and paper web from which the condenser is then being wound is drawn directly across the following arbor. This arbor is slotted and is indexed with its slot conforming to the plane of the condenser web, so that it may be advanced to engage the web in the slot prior to the completion of the winding on the arbor preceding. An automatic mechanism then functions to simultaneously start the rotation of the following arbor and cut the web at a point between the two arbors, so that the winding of one condenser is begun before the one preceding it is glued or stripped from its arbor. These operations are automatically done after the winding on the following arbor has been started.

A novel foil scoring and severing device is provided whereby the foil entering the web in interleaved relationship between the dielectric paper sheets is weakened at a predetermined point, so that the foil sheet may be severed after it has passed into interleaved relationship with the paper of the web. This also accomplishes a double function. First, it provides a gap in the foil of the web so when the web is cut off the paper sheets of dielectric material will overlap both ends of foil plates and prevent any possibility of short-circuiting between these plates. In addition it leaves the leading edge of the foil strips frictionally engaged in interleaved relationship with the paper strips of the web, so that the paper supports the foil and the frictional engagement of the paper strips on the foil will positively lead the foil into the next winding.

The manner in which the foregoing objects are accomplished in the present invention is best described in conjunction with the drawings of this specification, wherein the present preferred commercial embodiment of these teachings is illustrated. In the drawings:

Figure 6 is an enlarged detail sectional view of the front of the winding arbor turret and foil severing mechanisms. The view is taken substantially on the plane of line 6—6 of Figure 4;

Figure 7 is a diagrammatic illustration of the operation of the foil severing mechanism, showing the manner in which the foil is severed and spaced away from the end edges of the dielectric sheet;

Figure 8 is a diagrammatic illustration similar to Figure 7 but showing the operation of the paper cut-off knife; and Figure 9 is another diagrammatic illustration of the operation of the mechanism shown at the point at which the finished condensers are stripped from the winding arbors;

Figure 10 is a central sectional view of the arbor turret taken through the center lines of each of the arbors;

Figure 11 is a detail sectional view taken transversely of the turret and substantially on the plane of the line 11—11 of Figures 2, 4 and 10;

Figure 12 is a detail sectional view taken substantially on the plane of the line 12—12 of Figure 10;

Figure 13 is an enlarged detail view of one of the split winding arbors of the machine showing the manner in which the stripping plate is positioned between the arbor pins to release the finished condensers from the pins when the arbor is retracted.

Figure 14 is a detail sectional view taken substantially on the plane of the line 14—14 of Figure 10;

Figure 15 is a detail sectional view taken substantially on the plane of the line 15—15 of Figure 14;

Figure 16 is a rear view of the turret mechanism and is taken substantially on the plane of line 16—16 of Figures 2 and 4;

Figure 17 is a side elevational view of the timing and speed control unit of the machine;

Figure 2:
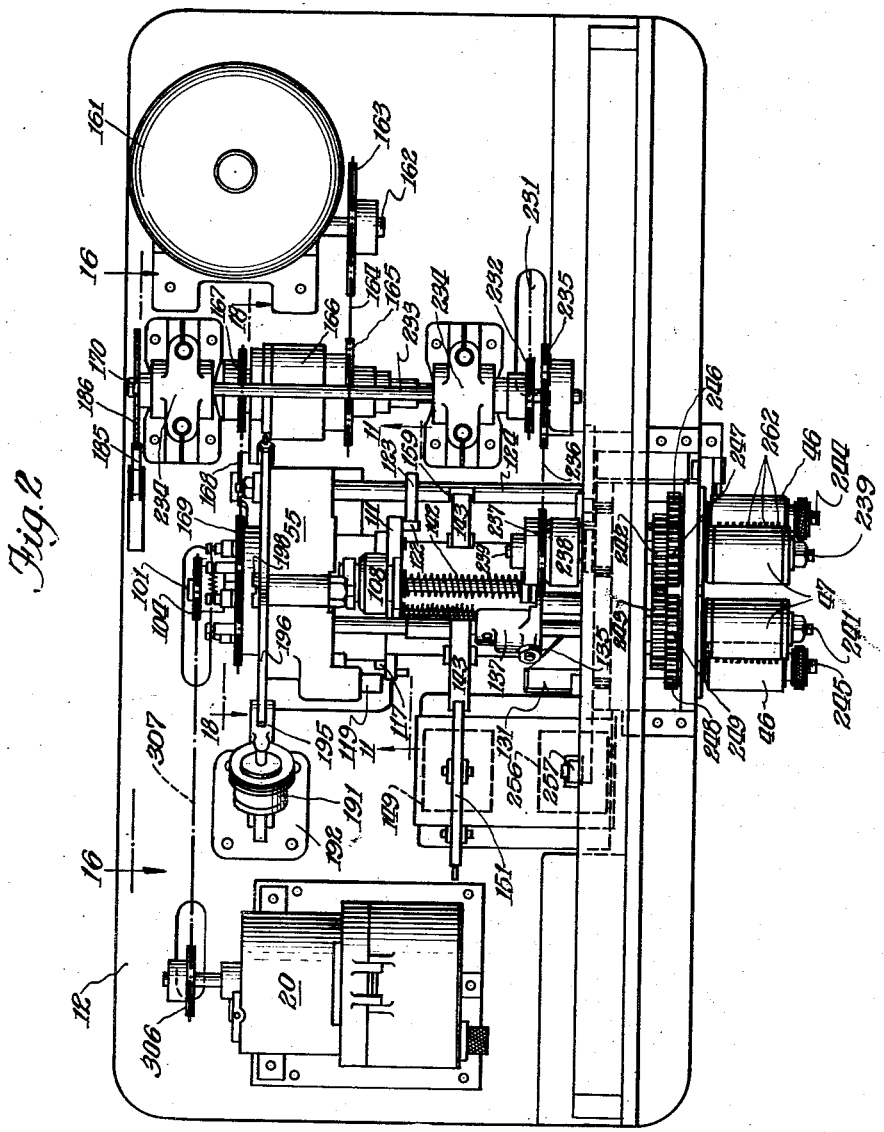
Figure 2 is a plan view thereof.
Figure 3:
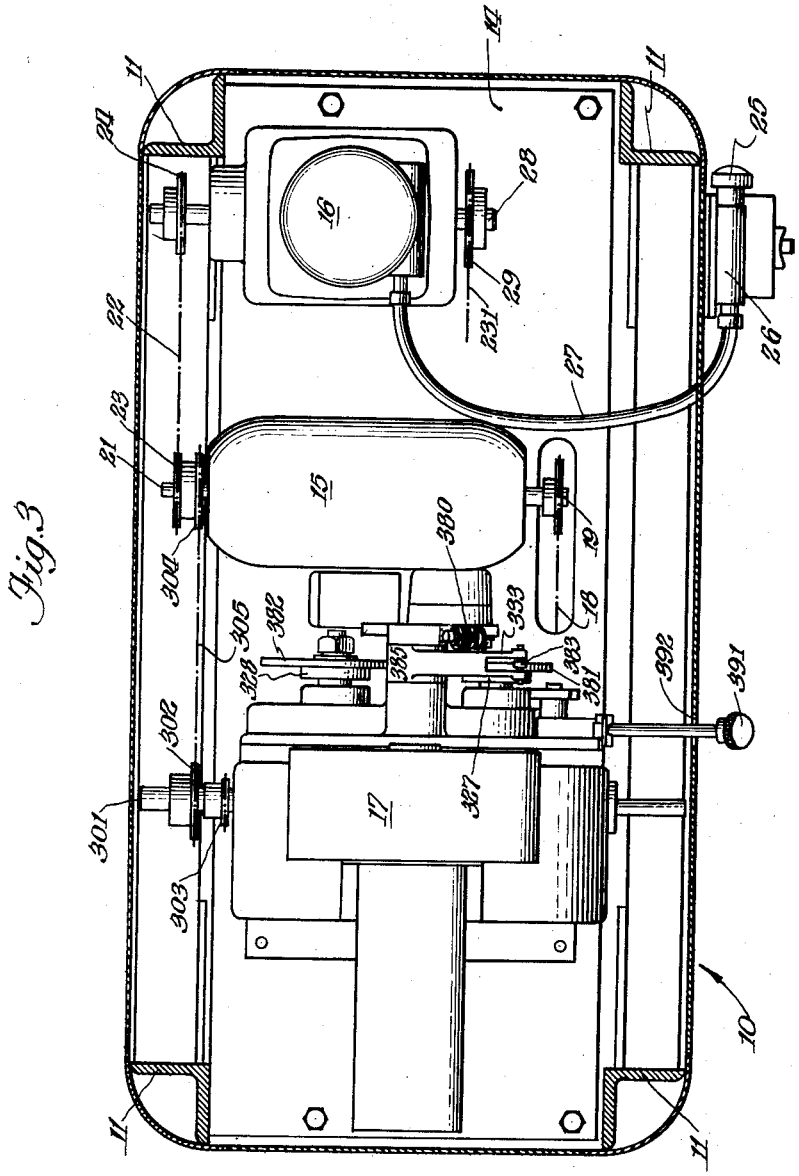
Figure 3 is a plan sectional view taken substantially on the plane of the line 3—3 of Figure 1.
Figure 19:
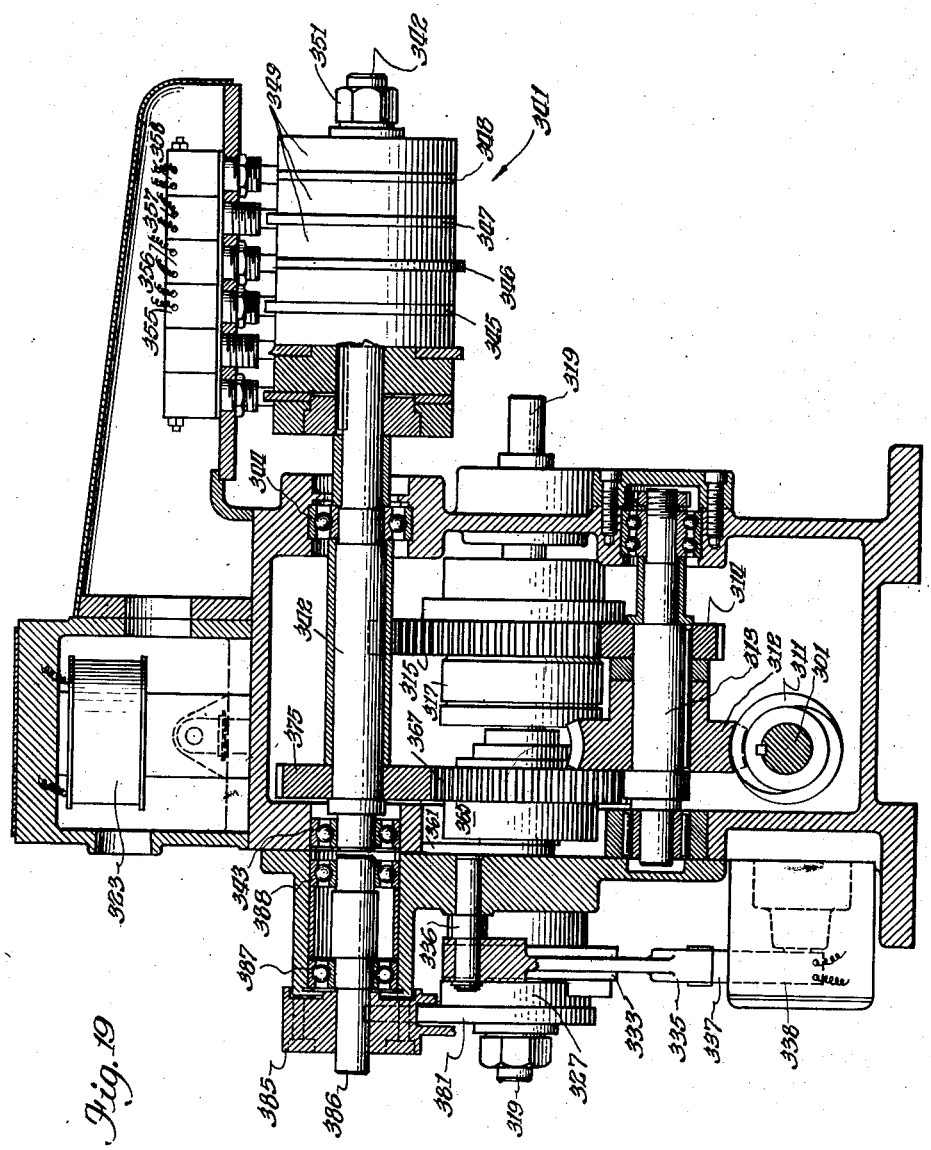

Figure 18 is a sectional view thereof, taken on the plane of the line 18—18 of Figures 2 and 17; and Figure 19 is a sectional view through the timing and speed control mechanism, taken substantially on the plane of line 19—19 of Figure 17.

The cabinet and frame of the machine

The machine includes a cabinet generally indicated by the ordinal 10, with a framework including four angle iron uprights 11 to support a top plate 12 and face plate 13 on which the principal parts of the operating mechanism of the machine are mounted. The cabinet also includes a lower shelf 14 on which an automatic speed changer 15, manual speed changer 16 and timing and speed control mechanism generally indicated at 17 are mounted. A driving motor 30 is mounted on a base shelf of the cabinet and acts through a flexible belt 18 to drive the power input shaft 19 of the automatic speed changer. The output shaft 21 of the automatic speed changer drives the manually operable speed changer by means of a chain 22 extending between the sprockets 23 and 24. The driving ratio of the manually operable speed changer is controlled by a hand knob 25 located on the control unit 26 on the outside of the cabinet and connected to the speed changer unit through a flexible shaft 27, and the power output shaft 28 of the unit carries a sprocket 29, from which a chain drive extends to the mechanism employed to score and sever the foil of the condensers.

The foil and paper supply

The face plate 13 in the machine carries a plurality of spool mounting spindles, each provided with a light friction drag and each adapted to mount a reel of metal foil or paper dielectric material. In the machine illustrated, provision is made for utilizing as many as twelve separate layers of paper dielectric in addition to the foil plates, in order that the machine be adapted to produce a condenser of the precise characteristics desired; but the operation will be described in connection with a condenser in which the web consists of six layers; with two strips of paper between the foil strips and a single thickness on each side, so that when the winding is completed the successive turns of foil are also spaced from each other by two thicknesses of paper. To this end supply reels F1 and F2 of foil are positioned on the spindles 31 and 32 while paper supply reels P1, P2, P3 and P4 are mounted on the spindles 33, 34, 35 and 36, respectively.

The paper strips from the reels P1 and P3 are fed between idler rolls 37, 38 and 39 to the turret arbor, generally indicated at 41. The paper from the reels P2 and P4 is also drawn over idlers 42 and 43 to meet the paper from the reels P1 and P3 as the four layers pass between the idler rolls 39.

The foil strips from the reels F1 and F2 are passed over the idlers 44 and 45 and through foil scoring and severing devices, including the yieldable rubber surface rolls 46 and the scoring and foil grasping rolls 47. The foil is then led over the lowermost idler rolls 39, where it is interleaved between the strips of paper, with the foil from the reel F1 between the paper strips from the reels P1 and P2 and the foil from the reel F2 between the paper strips from the rolls P3 and P4. It will be understood by persons acquainted in the art that the paper strips will normally be in exact alignment with each other but that the two foil strips will be oppositely offset; so that one strip of foil projects beyond the edges of the paper dielectric at one side of the web and the other strip of foil projects beyond the edges of the paper on the other side. This is, of course, conventional practice for the purpose of providing a condenser terminal along the edge of each plate, as well as to space the opposite edges of the foil inwardly from the edge of the dielectric enough to prevent contact between the two foil plates.

The turret

The condensers are wound in alternate succession on two arbors rotatably mounted on the turret 41 at opposite points, the arbors being generally indicated by the numeral 51. The mechanical structure of these arbors and the turret by which they are carried is best illustrated in Figures 4 to 6 and 10 to 15, inclusive, where it will be seen that the turret consists of a rotary frame having a flanged forward rotor 52 journaled for rotation in the bearing block 53 and a circular rear rotor 54 also journaled for rotation in a rear bearing casting 55 (Fig. 10). The rotors 52 and 54 are rigidly connected to each other by means of a pair of longitudinally extending shafts 56, each of which has a reduced end portion 57 extending into a bore of the rotor at each end of the turret and fixedly mounted therein in any convenient manner, as by a plug 58 secured in position by a threaded cap screw 59 (Fig. 15). Thus the forward rotor 52 and rear rotor 54 of the turret are locked together so that the entire turret is rotatable as a unit in the bearings 53 and 55. A retaining bar 50 secured to the forward face of the bearing 53 overhangs the forward rotor 52 of the turret to hold it against longitudinal shifting in its bearings (Figures 6 and 10). This bar also supports a forwardly extending guide bar 60 by which the web is positioned directly over the center of the upper arbor 51.

The winding arbors

The winding arbors 51 of the turret are mounted on opposite centers, and each arbor is carried by paired ball bearings 62 spaced apart in the opposite arbor bores 63 of the rotor 52 by tubular spacers. The bearings 62 each carry an arbor mounting sleeve 64 the forward end of which is closed by a perforated plug 65. The sleeves 64 are each keyed to a retractable sleeve or tubular shaft 67 in which the arbor itself is mounted.

The arbors each comprise a pair of substantially identical half round pins 68 mounted in a plug fitting 69 keyed in the sleeve 67 by the cross pin 71 and projecting outwardly through the openings in the perforated plugs 65 at the forward end of the sleeves 64. The sleeves 67 are slidable within the sleeves 64, so that the pins 68 of the arbor may be rotated with the rotation of the sleeves 67 and 64, but may be withdrawn into the sleeve 64 as shown in the upper portion of Figure 10, so that a condenser wound on the arbor may be dislodged therefrom by spring 76 as shown in Fig. 9, or projected outwardly through the plug 65, as shown in the lower position. The arbor pins 68 are separated in the plug 65 by a thin stripping plate 66 placed between them and secured to the plug 65.

When in projected position, the outwardly flared forward end surfaces of the arbor pins 68 engage a pointed needle 81 carried by an adjusting screw 82 and ball bearing 83 on the tail stock casting 84. This tail stock casting is mounted on a central extension bracket 85 having a cylindrical pilot rod 86 extending into a center bore 87 of the rotor 52 of the turret. The tail stock is secured in position on the face of the turret rotor by a face plate 88 pinned to the shaft by taper pin 89 and secured to the forward face of the rotor 52 by a pair of cap screws 91 (Fig. 6).

The arbors are thus independently mounted for longitudinal sliding movement, as well as for rotation on their own centers and for orbital movement around the centers of the turret so that the arbors may be advanced to engage the web of foil and paper as the winding is started, and retracted to strip the condenser from the arbor when the winding has been completed.

The means for rotating the arbors includes the driving spindles 95, which are telescoped into the sleeves 67 and extend as far forwardly as the sleeves 64. The rearward end of these spindles rotate in the ball bearings 96 and bear against the thrust bearings 97. The forward end of each of these spindles 95 is keyed to the sleeve 67 by a collar 98 in which a pair of keys 99 are secured. These keys extend through the walls of the sleeve 67 and ride in the longitudinal keyways of the spindle 95 (Fig. 12).

The arbor driving mechanism

The arbors are driven through a central drive shaft 101 common to both arbors and mounted in ball bearings 102 and 103. The shaft has a sprocket 104 on its outer end and a pinion 106 on its inner end. The pinion meshes with a pair of spur gears 107 carried on the rotatable housings of a pair of clutches 108 on the arbor spindles 95, so that when these clutches are engaged the spindles and arbors are driven from the shaft 101. The clutches 108 are of the indexing type, so that whenever either clutch is disengaged the corresponding arbor will always come to rest in the same angular position with respect to the turret.

The clutches 108 are controlled by a pair of toggle knuckles 111, each of which is separately pivoted on one of the studs 112 carried on the outer end of an extension bracket 113 mounted on the shafts 56 of the turret frame (Fig. 11). The toggle knuckles 111 each include a latch hook 114 adapted to engage the stop dog 115 on its corresponding clutch to stop the arbors. The two knuckles are interconnected by a coiled wire tension spring 116, which moves across the center of the pivot stud 112 when either clutch is engaged or disengaged, so that the toggle knuckles will maintain themselves either in the engaged position shown in the upper right hand portion of Figure 11, or the disengaged position shown in the lower lefthand portion of the same figure. The knuckles 111 each carry a disengaging roller 117 mounted on a rearwardly extending pin 118 and adapted to engage a segmental cam 119 as the turret rotates, so that the rotary motion of each of the spindles 95 and winding arbors is arrested as the turret moves in a clockwise direction beyond the position shown in Figure 11. The cam 119 may be mounted in any convenient manner, preferably being secured to the rear bearing casting 55 of the turret arbor by cap screws 121.

The clutches 108 are engaged by outward movement of the piston rod 194 of the air cylinder 191, which rocks the shaft 124 and releases the toggle knuckles. To this end each of the knuckles is provided with a forwardly extending pin 122, and a clutch tripping arm 123 is mounted on a rock shaft 124 in such a manner that (in Figure 11) clockwise movement of the rock shaft will cause the arm 123 to strike the pin 122 and pivot the knuckle around the stud 112 to release the latch hook 114 from the stop dog 115 of its clutch. The pivotal movement of the knuckle 111 causes the tension spring 116 to move across the center of the pivot stud 112, so that the spring then holds the knuckle latch hook away from the clutch, and leaves the clutch engaged until the turrent has moved around to the cam 119.

The arbor retracting mechanism

Figure 4:
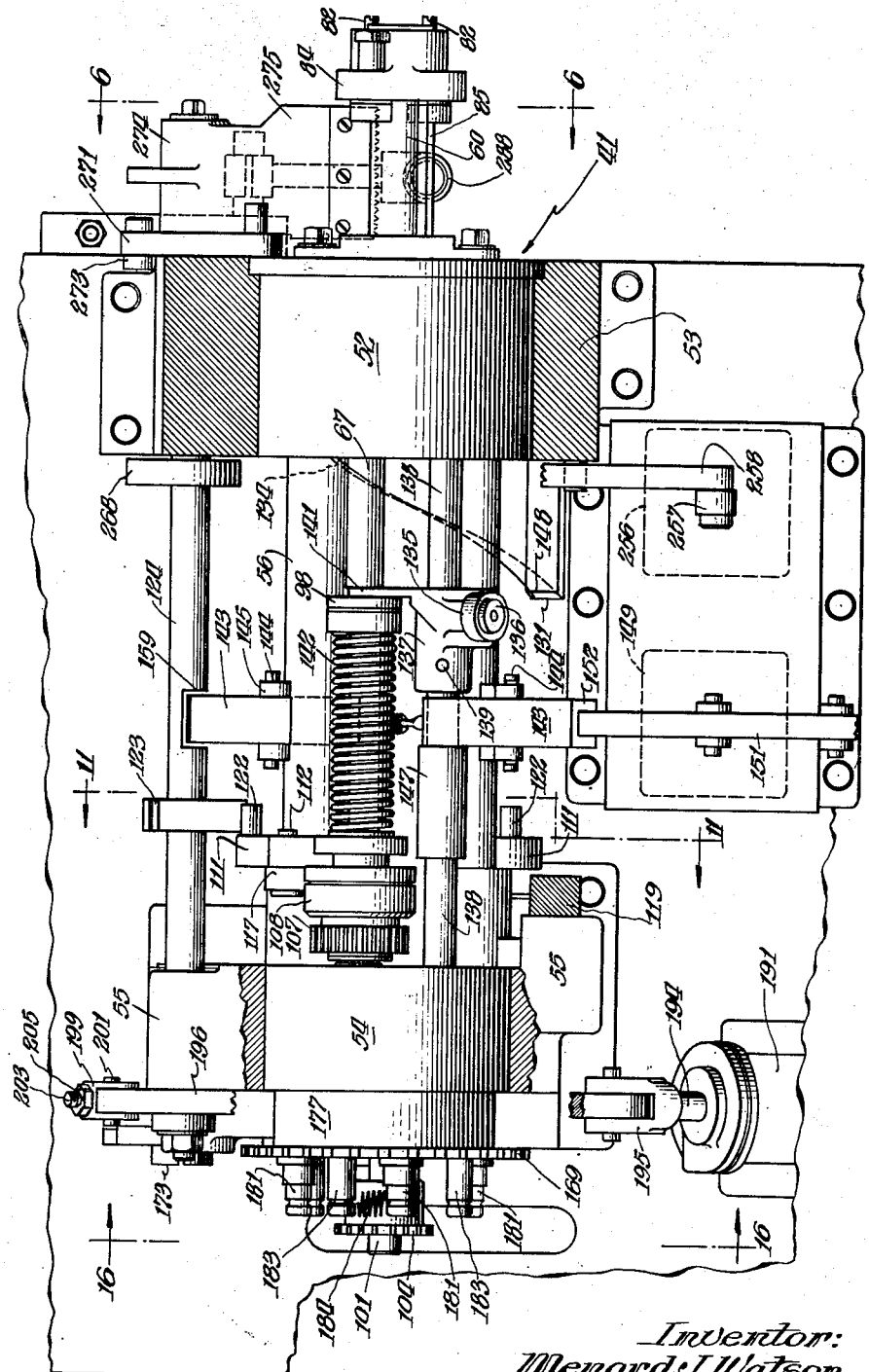
Figure 4 is a fragmental plan sectional view taken substantially on the plane of line 4—4 of Figure 1.

The winding arbors 68 are slidably mounted, so that they may be extended to the live centers of the tail stock to engage the condenser web prior to winding, and automatically withdrawn into the arbor sleeves of the turret when the winding is completed, in order to strip the finished condensers from the arbor pins. The retracting movement of the arbors is accomplished by a stationary cam, arranged to retract either of a pair of slide rods mounted parallel to the arbor spindles and connected to them, as best shown in Figures 4 and 14. The cam 131 is of helical form and is fastened to the rear surface of the forward turret bearing 53 by cap screws 132 extending through the flange 133 of the cam. The cam 131 is thus positioned immediately behind the rear face of the turret rotor 52 so that the lower end 134 of the cam will lie in the path of movement of the cam follower rollers 135 carried on studs 136 in a fitting 137 pinned to the slide shafts 138 by a dowel 139. The fittings 137 each include a yoke 141 engaging the rotatable collar 98 on one of the arbor driving spindles 95 so that rotation of the turret in its indexing movement will cause the cam follower rollers 135 to strike the lower leading edge 134 of the stationary cam 131 and ride upwardly and rearwardly on the cam surface. This causes the lower slide rod 138 to move rearwardly, and the yoke 141 extending between the rod and the lower arbor spindle acts through the rotatable collar 98 to shift the sleeve 67 rearwardly within the sleeve 64 and draw the arbor pins 68 inwardly through the aperture in the plug 65. The inward movement of the arbor pins naturally tends to draw the coiled condenser inwardly, but the condenser is stripped from the pins 68 by the thin plate 66 mounted between them. The finished condensers normally fall from the arbor pins into a delivery receptacle, but a spring arm 70 is mounted on the plate 50 and extended across the path of motion of the arbors to dislodge any coils that might accidentally stick to the arm or stripping plate. The retracting movement of the arbor is accomplished against the coiled compression spring 142, but return movement of the arbor is prevented by the operation of one of the latch arms 143 which are pivoted on pins 144 extended between mounting brackets 145 on each of the shafts 56 of the turret. These latch arms are drawn toward the slide shafts 138 by a single coiled tension spring 146 which extends between the opposite latches. When the shafts 138 are moved rearwardly by the cam 131, the latching collars 147 fixed to the shaft move to a point behind the latch arms 143 and are engaged by the latches so that the slide shaft, arbor sleeve and arbor are all latched in retracted position, where they remain after the cam follower rollers 135 leave the upper end 148 of the cam 131. The arbor pins are thus automatically retracted and latched by the rotation of the machine turret. The rock shaft 124 (Figure 4) is notched at 159 so that the outwardly extending trip portions 152 of the latch arms 143 clear the shaft during the rotation of the turret.

The arbor advancing means

The arbors are disengaged from their retracting latches automatically by the functioning of a solenoid 149 (Figure 4) which acts through a lever 151 to strike the outwardly extending trip portion 152 of the latch lever 143. This pivots the latch lever on the pin 144, releasing the slide rod 138 and fitting 137 for forward movement, which will be caused by the influence of the previously compressed spring 142. The forward movement of the slide rod and arbor sleeve 67 projects the arbor pins 68 forwardly through the opening in the plug 66 of the arbor mounting, moving the arbor pins into engagement with the web of foil and paper. As the arbor pins 68 advance, the indexing action of the arbor clutch 108 will hold the pins indexed with the slot between them in vertical position, so that the pins pass on opposite sides of the paper and foil web, and seat in the live center of the tail stock so that the arbor is ready for rotation. It is desirable to cushion the forward movement of the arbors, however, and each slide rod 138 is accordingly provided with a leather cup washer 155 fitted into a bore 156 of the turret rotor 52. The forward end of these bores 156 are closed by vented plugs 157, so that the bore acts as a dashpot or air cushion, to retard the forward movement of the parts sufficiently to prevent damage to the arbor pins. The slide rod 138 is grooved at 158 to allow air to flow unrestrictedly into the dashpot on the rearward stroke of the rod.

From the above it will be seen that the arbors are withdrawn by the action of the cam 131 when the turret indexes through one-half a revolution of movement from the positions shown, but that the upper arbor is maintained in retracted position until the latch 143 is tripped by the solenoid 149 acting through the lever 151.

The turret drive

The rotary movement of the turret is accomplished by a driving motor 161 which acts through a reduction gearing within the motor housing to rotate a power output shaft 162, which carries a sprocket 163. The sprocket 163 transmits rotary movement through a chain 164 and driven sprocket 165 to a countershaft 170 positioned parallel with but spaced away from the turret. The countershaft 170 carries a single revolution clutch 166 by which the shaft is coupled to a sprocket 167 over which a chain 168 extends to the driven sprocket 169 at the rear of the turret assembly. The clutch 166 has a stop shoulder 171 (Figure 16) adapted to be engaged by a latch arm 172 pivotally mounted on a stud 173 fixed in the rear arbor bearing. The arm 172 is urged into engagement with the stop shoulder of the clutch by coiled tension spring 174. The stud 173 also carries a latch arm 175 adapted to engage the stop surfaces 176 of an indexing plate 177 which is secured to and rigidly assembled with the rear rotor 54 of the turret.

The turret driving sprocket 169 is rotatably mounted on the hub 178 of the indexing plate 177 and a plurality of studs 181 are fixed in the plate to extend through arcuate slots 182 in the sprocket to provide limited relative rotation between the sprocket and the indexing plate. The studs 181 are joined to corresponding studs 183 on the sprocket by coiled tension springs 184, so that spring tension is exerted between the sprocket and the indexing plate.

When the clutch 166 on the countershaft 170 is engaged, the shaft moves through one revolution of movement before the stop shoulder 171 engages the arm 172 to disengage the clutch. The shaft 170 is, however, locked against return motion by the engagement of the spring urged latch 185 with the latching disc 186 on the end of the shaft. The rotary motion of the countershaft 170 is transmitted to the turret through the sprocket 167, chain 168, and sprocket 169, and since the sprockets 167 and 169 are of one to two ratio the single revolution of movement of the countershaft results in half a revolution of the turret.

The indexing devices of the turret

The motion of the turret is arrested at the precise point desired by engagement of the indexing arm 175 with one of the stops 176 on the indexing plate; but the parts are so related that the sprocket 169 is drawn a few degrees beyond this point before clutch 166 disengages. This continued movement of the sprocket 169 after the turret has ceased its motion extends the springs 184 enough that the tension of these springs holds the stop surface 176 of the turret indexing plate 177 firmly against the arm 175, thus indexing the turret to the precise position desired. The spring urged latch 185 and latch disc 186 prevent any backward rotation of the shaft 170 and thus hold the upper span of the chain 168 taut, so that all of these parts remain in this position until the next indexing movement of the turret.

The indexing of the turret is accomplished by simultaneously releasing the indexing plate 177 and engaging the countershaft clutch 166, so that the clutch and countershaft make a full revolution of movement and rotate the turret 180 degrees. This indexing is initiated by the upward stroke of an air cylinder 191 having its lower end pivoted to a bracket 192 on the base plate 12 of the machine at a point adjacent the rear bearing 55 of the turret. The piston shaft 194 of the air cylinder has a clevis 195 joined to the lever 196 by a pin 197. The lever 196 is pivoted on a stud 198 in the rear bearing 55 of the turret, and has its opposite end joined to an adjusting fitting 199 by a pivot 201. The fitting 199 carries a clevis 202 having a screw threaded shank 203 and a pair of adjusting nuts 204 and 205 so that the cross pin 206 of the clevis 202 is adjustably joined to the outer end of a short crank 207 fixed to the rear end of the rock shaft 124 previously described.

The rock shaft also carries a latch tripping plate 208 having a dog 209 adapted to engage the retractable dog 211 of the indexing arm 175. The dog 211 is pivoted on a cross pin 212 extending between spaced flanges on the indexing arm 175 and a coiled compressing spring 213 is positioned in a socket below the operating end of the dog to normally maintain it in the position shown in Figure 5. From a comparison of this figure and Figure 16 it will be seen that in the operation of these parts the clockwise rotation of the shaft 124 will cause the dog 209 to engage the retractable dog 211 and release the latch arm 175. Since the arm 175 carries an adjustable set screw 214 adapted to bear on the upper surface of the latch arm 172, they will both be released in response to clockwise rotation of the rock shaft 124, but the latch 175 will release the turret an instant before the latch 172 allows the clutch 166 to engage. Thus both the clutch 166 and the locking plate 176 of the turret will be released to permit the turret to rotate. It is to be noted, however, that the continued clockwise movement of the dog 209 overrides the end of the retractable dog 211, whereupon the coiled tension springs 174 and 215 act to return the latch arms 175 and 172 to operating position. On the outward stroke of the air cylinder, however, shaft 124 moves in a counter-clockwise direction, so the dog 209 will snap the retractable dog 211 downwardly against the spring 213 as it returns to its original position.

The rock shaft 124 extends forwardly from this turret indexing mechanism to the front panel of the machine, where it performs the functions of releasing the brake of the foil scoring and severing rollers, actuating the paper cut-off knife and the glue applicator, and engaging the arbor clutches.

The foil scoring and severing devices

The foil scoring and severing rollers, best illustrated in Figures 6 to 9, consist of two pair of co-acting rolls, each of the opposite and identical pairs including a rubber surfaced roll 46 and a cooperating scoring and foil grasping roll 47. The entire cluster of rolls is driven from the speed reducer 16 (Figure 1) through a flexible chain 231 extending upwardly to a sprocket 232 on a countershaft 233 mounted in brackets 234 immediately above the shaft 170. The shaft 233 carries a sprocket 235 which operates through a chain 236 extending to a sprocket 237 to rotate a clutch 238 on the shaft 239 of one of the scoring and foil grasping rolls 47. The shaft 239 and its corresponding shaft 241 are geared together by a pair of spur gears 242 and 243 (Figure 2), and each of the shafts 239 and 241 are geared to the corresponding shafts 244 and 245 of the rubber surfaced rolls 46 by the spur gears 246, 247 and 248, 249 respectively. The clutch 238 includes a stop dog 251 (Fig. 5) which, in the normal operating position of the machine, engages the end of a rocker arm 252 so that the cluster of rolls 46 and 47 are held against rotation and in the position shown in Figure 6. The rocker arm 252 is mounted on a pivot stud 253, however, and has a spring 254 normally holding it against a stop pin 255, so that the end of the arm lies in the path of rotary movement of the stop dog 251. The rocker arm is arranged to be moved out of the path of the dog 251 by the actuation of a solenoid 256, the motion of which is transmitted through a link 257 and rocker arm 258 to the arm 252. Thus when the solenoid is energized the link 257 is drawn downwardly to the pivot rocker arm 258 on its mounting stud 259 and to release the rocker arm 252 from engagement with the dog 251 on the clutch 238.

It has been mentioned earlier that the rolls 46 were provided with a resilient rubber surface and that the rolls 47 include means for scoring the foil strip as it moves over the rolls toward the winding arbor and also include means to grasp the foil and exert a braking action thereon so that the tension on the foil would cause it to sever at the point where the scoring was done. To this end each of the rolls 47 includes a scoring or crimping bar 261 in which a plurality of projecting pins 262 are mounted, with the ends of the pins projecting slightly beyond the outer surface of the bar to a position wherein they engage and press into the rubber surfaces of the rolls 46 when the cluster of scoring rolls rotates. It is understood that various forms and modifications of precise scoring means disclosed here may be indulged in without departing from the spirit of this invention, but satisfactory results are obtained by the use of a row of pins 262 so that the several pins form a line of closely spaced indentations in the foil strip. The rolls 47 are each also provided with a foil grasping bar or segmental projection 263 projecting somewhat above the outer peripheral surface of the rolls, so that on rotation of the rolls to the position of Figure 7 the bar will engage the foil strip and hold it firmly against the rubber surface of the roll 46.

In operation the arm 252 normally holds the rolls 46 and 47 stationary and in the position illustrated in Fig. 6 so that the peripheral surfaces of the rolls are slightly spaced apart and do not contact each other. The strips of foil are threaded between the rolls 46 and 47, but the foil is entirely free to move and is drawn between the rolls only by the winding movement of the arbor. As the winding of a condenser nears completion, however, solenoid 256 is actuated to score and sever the foil strip. The solenoid acts through link 257 and rocker arm 258 to pivot the arm 252 and release the stop dog 251 of the clutch 238. The clutch engages, and the rolls 46 and 47 are then driven from the speed reducer 16 through the chains 231 and 236, it being understood that the control unit 21 of the speed reducer may be manually set so that the peripheral speed of the rolls 46 and 47 is substantially the same as the linear speed of the foil passing between them. As the rolls 47 begin rotation the pins 262 engage and score the foil, but the roll continues to rotate through about seven eights of a revolution, during which time the scored portion of the foil is drawn inwardly and downwardly between the idler rolls 39 to a position adjacent the guide bar 60 or winding arbor pins 68. The roll 47 continues to rotate until the stop dog 251 on the clutch 238 strikes an abutment 265 on a secondary clutch control lever 266, which is pivoted at 267 and controlled by the arm 268 on the rock shaft 124. The angular relationship of the stop 251 and the grasping bar 263 is such that the engagement between the stop 251 and the abutment 265 brings the roll 47 to a stop when the foil grasping bar 263 is in engagement with the surface of the foil so that the foil is grasped between the bar and the resilient rubber surface of the roll 46 (Figure 7). This stops the forward movement of the foil strip, but since the arbor continues to rotate and draw the foil into the condenser coil the foil strip will break at its weakest point, which is, of course, the point at which it was scored by the pins 262.

The thickness of the foil and paper are exaggerated as shown in the drawings, since these layers may actually be only about .0002" thick. Consequently even when the web passes between the closely spaced idler rollers 39 the foil is not firmly gripped at this point, but is carried forward principally by the direct tension of the winding arbor on the foil, and only secondarily by the frictional engagement between the surfaces of the foil and paper. The result is that the continued rotation of the arbor will feed some length of paper to the arbor without advancing the severed foil, so that the paper may be cut off with the trailing ends of the foil layers terminating well short of the ends of the paper and, if desired, so that one or more layers of protective paper may be wound on the outside of the condenser.

When the paper strips have been cut off and the winding of a new condenser is to be started, the movement of the rock shaft 124 and the arm 268 will swing the control lever 266 outwardly and release the stop dog 251 of the clutch 238. The clutch 238 is thus released from the abutment 265, but it moves only about one eighth of a turn until it is stopped by the lever 252. The initial movement advances the rolls 46 and 47 a part of a turn, however, and, since the movement begins while the foil is still gripped between the bar 263 and the rubber surface of the roll 46, it tends to exert a momentary pull on the foil and start it again feeding into the web from the reel. The light frictional drag exerted by the moving strips of dielectric paper on both sides of each layer of foil is then effective to positively draw the leading edge of each of the foil strips into the coil being wound on the arbor.

The paper cut-off

The rock shaft 124 extends forwardly of the front panel of a machine and carries a short crank 271 linked to a rocker arm 272 by a vertical link 273. The rocker arm 272 is mounted on a pivot stud 274, and this stud also carries a knife arm 275 having a cut-off knife 276 secured to its inner end. A tension spring 277 urges the opposite end of the arm downwardly, so that the spring tends to swing the cut-off knife 276 upwardly against the condenser web at one of the notches 278 in the tail stock bracket 85 of the turret. The rocker arm 272 carries a pin 281 overhanging the upper surface of the knife arm 275 so that the movement of the rock shaft 124 in counterclockwise direction (Figure 6) moves the knife arm downwardly against the action of a spring 277. When the shaft 124 rocks in the opposite direction, the spring 277 snaps the knife arm upwardly to cut the paper at a point between the two arbors.

The glue applicator

The link 273 extending from the crank 271 to the rocker arm 272 also extends downwardly and outwardly to form a stop 282 below an adjusting screw 283 on a rocker arm 284. The arm 284 is pivoted on a stud shaft 285 and is provided with a downwardly acting tension spring 286 and limit stop 287 at one end, and with a glue applicator 288 at the opposite end. The glue applicator is normally held in a position below the outer surface of a condenser being wound on the lower arbor of the turret by the stop 282 and screw 283 but it will rise to engage the outer windings of a condenser on the arbor whenever the stop is moved downwardly. Liquid glue is supplied to the wick 289 of the glue applicator by a supply tube, which may be conventional and is not therefore illustrated in the drawings.

Sequence of operations

The sequence of operations by which a condenser is wound on a machine according to these teachings includes the following successive steps:

1. The upper arbor advances longitudinally of its axis to engage the foil and paper web (Fig. 7).
2. The arbor begins to rotate on its axis to initiate the winding (Fig. 8).
3. The turret rotates through one-half of a revolution of movement, carrying the rotating arbor in an orbital path toward the lower arbor station (Fig. 9).
4. As the winding approaches completion, the scoring rolls 46 and 47 begin rotation, causing the pins 262 to score the foil before it passes between the idler rollers 39 toward the winding arbor.
5. The scoring rolls 46 and 47 come to rest, with the foil grasping bar 263 holding the foil strip against the resilient surface of the roll 46 so that movement of the foil is halted.
6. The continued rotation of the arbor causes the foil to break at the point where it was previously scored, which has now moved to some point adjacent the guide bar 60 or arbor.
7. The rotation of the arbor continues to draw the paper webs into the condenser coil until the trailing edge of the foil between the sheets of paper has moved beyond the notch 278 in the tail stock support 85.
8. The glue applicator rises to touch the outer surface of the condenser coil immediately before completion of the winding.

9. The cutoff knife snaps upwardly into the notch 278 to sever the paper at a point intermediate the ends of the foil strip (Fig. 6).

10. The knife and glue applicator are retracted.

11. The rotating arbor begins another half revolution of orbital movement with the turret.

12. The rotation of the arbor on its axis ceases, but its orbital movement continues.

13. The arbor is retracted into the arbor sleeve, stripping the finished condenser from the arbor pins.

14. The finished condenser falls into a receptacle or is knocked down by the spring arm 70 (Fig. 9).

While each of the condensers manufactured on the present machine is subjected to the several operative steps outlined above, yet the mechanism is so designed that the winding is substantially continuous. That is, there is no delay necessary after the completion of one winding to permit the operations of cutting, gluing and stripping the condenser from the arbor. On the contrary, the enumerated sequence of operations overlap to a substantial extent, so that each winding is initiated several turns before the winding and gluing operations of the winding preceding it are completed; thus they bring about a higher rate of productivity than is possible in conventional machines wherein each condenser must be completed and stripped from its arbor before the winding of the next succeeding condenser can begin.

In brief, the above sequence of operations is accomplished in four separate and well defined steps, each initiated by an electrical switch included in the timing and speed control unit 17; two of the switches being individually effective to operate the solenoids 149 and 256 and the other two switches being arranged to actuate valves controlling the compressed air cylinder 191. The sequence of operation of these controls is as follows:

1. The solenoid 149 is energized, drawing the lever 151 downwardly (Fig. 14). The outer end of the lever 151 strikes the latch arm 143, pivoting it about the pin 144 so that the latch releases the collar 147 on the slide shaft 138. The coiled compression spring 142 on the arbor shaft 95 then slides the arbor sleeve 67 forwardly to advance the arbor pins on opposite sides of the paper web.

2. The cylinder 191 is actuated to extend the piston shaft 194 upwardly to the position of Fig. 5. The motion of the piston shaft is transmitted through the lever 196 to the crank 207 on the rock shaft 124, and acts to swing the clutch release arm 123 inwardly against the pin 122 of the knuckle 111 (Fig. 11), thus releasing the stop 115 of the arbor clutch 108 to initiate rotation of the arbor. The rocking movement of the shaft 124 thus begins the winding of a condenser on the upper arbor and simultaneously acts through the crank 268 (Fig. 6) to move the lever 266 outwardly so that the clutch stop 251 is released from the abutment 265 and moves downwardly into engagement with the stop lever 252. This action initiates the movement of the foil supply reel and the frictional engagement between the foil and paper as they pass between the idlers and the winding arbor is effective to feed the leading ends of the foil strips into the coil. The same rocking movement of the shaft 124 that accomplishes these functions pertaining to the condenser on the upper arbor also actuates the cut-off knife and glue applicator to perform the final cutting and gluing on the condenser being finished on the lower arbor.

3. The third step of the machine's operation is started by energizing the upper end of the air cylinder 191 to draw the piston shaft 194 inwardly. This motion retracts the cutoff knife and lowers the glue applicator from the condenser at the lower arbor station and simultaneously allows the lever 266 to return to a position with the abutment 265 in the path of motion of the clutch stop 251; so that it is ready for the next operation. The rocking movement of the shaft 124 also simultaneously releases the indexing latch arm 175 from the abutment 176 on the turret, and releases the clutch arm 172 from the stop 171 on the clutch 166 of the turret countershaft 170 (Fig. 16). Both of these latching mechanisms release only momentarily, so that the turret advances only half a revolution.

Figure 5:
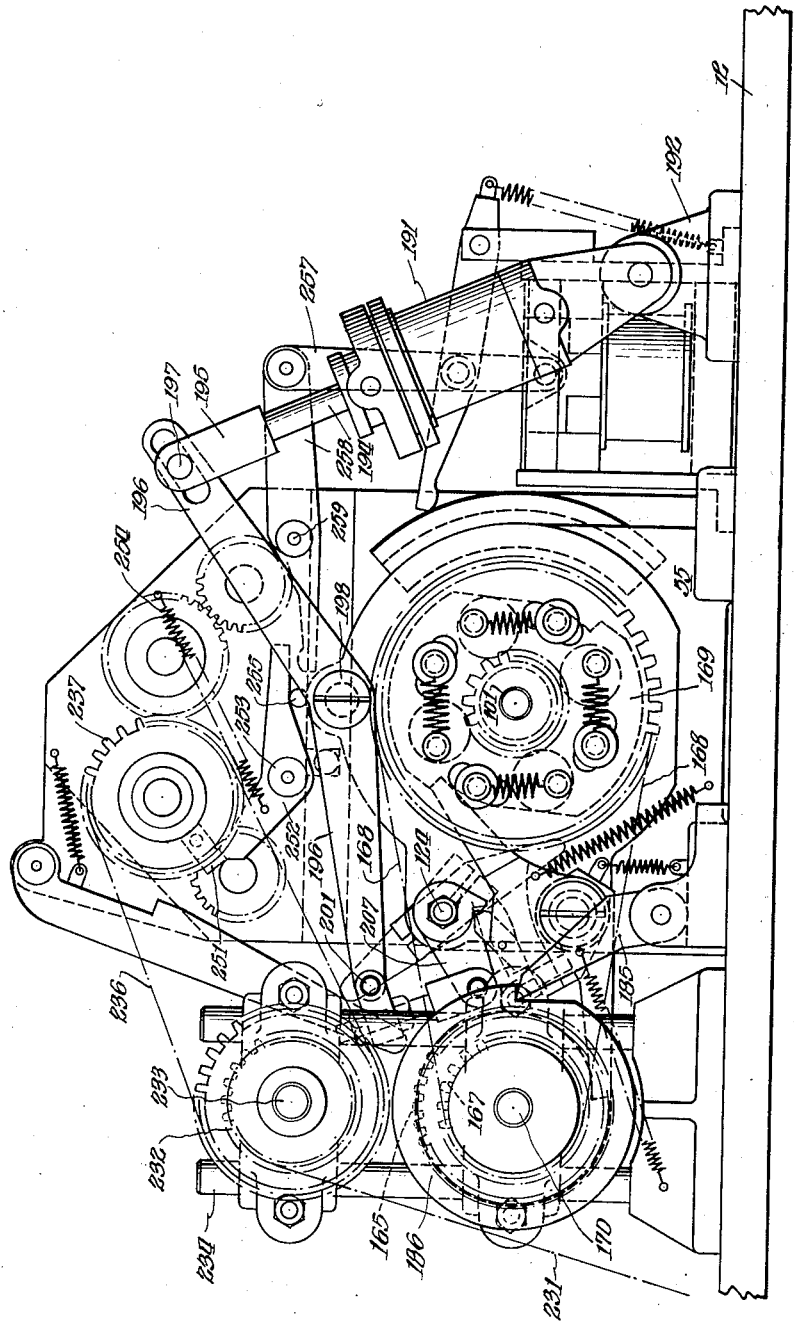
Figure 5 is a rear elevational view of the arbor turret of the machine, showing the driving and indexing devices of the turret and foil severing mechanisms.

4. The fourth step of the mechanism is initiated by energizing the solenoid 256. This solenoid acts through the link 257 and lever 258 to swing the rocker arm 252 out of engagement with the clutch stop 251 (Fig. 5.) The clutch 238 engages and drives the scoring and foil grasping rolls 47 through about seven-eighths of a revolution of movement. In the first part of their rotation the scoring pins 262 of these rolls impinge the surface of the foil strip as it passes over the resilient surface of the co-acting rolls 46 and weaken the foil so that it will break at the precise point desired when the strip is thereafter held against forward movement. After the scoring is accomplished the rolls 47 continue rotation until the scored portion of the foil is fed downwardly between the idlers 39 to a position adjacent the guide bar 69, at which time the stop 251 on the clutch 238 engages the abutment 265 on the lever 266 and brings the rolls 47 to a stop, with the foil grasping bar 263 pressing the foil against the resilient roll 46 (Fig. 7). The bar thus holds the foil against further movement, and the continued rotation of the lower arbor causes the foil to break as the paper strips of the web continue to feed inwardly. Thus the leading edge of the foil ends at some point above the cutoff knife, while the trailing edge of the foil of the condenser on the lower arbor is carried below the cutoff knife before the knife operates. It follows that both the leading and trailing edges of the foil will be spaced from the ends of the dielectric paper strips so that short-circuiting of the condenser by contact between the ends of the opposite plates is avoided.

*The turn counting and sequence control units*

In the above disclosure it has been shown that the several operations of the turret, winding arbors, cut-off knife and glue applicator are initiated either by one of the solenoids 149 and 256, or by the air cylinder 191. This air cylinder and these solenoids are under the control of a plurality of mechanically timed switches, so that the several operations of the machine will not only take place in the exact sequence desired, but also in order that the machine may be arbitrarily set to wind condensers of several or many turns, according to the exact specifications desired in the finished product. To this end the sequence of operations of the entire mechanism is controlled by the combined actions of a turn counting mechanism 20 and a timing and speed control device generally designated as 17. These mechanisms operate in synchronism with the rotation of the winding arbors of the turret, since the power input shaft 301 of the unit 17 is provided with a sprocket 302 driven directly from the power output sprocket 304 of the automatic speed reducer 15 by the chain 305, while a second sprocket 303 on the same shaft acts through the single chain 307 to drive the sprocket 104 on the turret and the sprocket 306 on the turn counting unit 20.

The timing and speed control unit 17 performs two principal functions. The first of these is to operate four electrical switches in the desired sequence and at properly spaced intervals. Two of these switches actuate solenoid valves (not shown) to control the flow of compressed air to the cylinder 191, while the other two energize the solenoids 149 and 256 respectively. The other function of the timing and speed control or sequence control unit, is to govern the automatic speed changer 15 so that the speed of the entire mechanism is accelerated and decelerated at an optimum rate throughout the entire winding cycle.

The internal mechanism of the turn counting unit 20 is not illustrated in the drawings, since the unit may be a conventional counting device; and its sole function in the present combination is to provide a means of energizing the electrical controls of the sequence control unit 17 after the winding arbor has made a specified number of revolutions. That is, the unit 20 is a mechanism which may be arbitrarily set to count any number of turns of the arbor shaft, and its function is to momentarily close an electrical switch each time the specified number of turns is made. The circuit from the switch of the unit is connected to solenoid actuated starting clutches of the sequence control unit so that this unit will complete its cycle of operations in the exact number of turns for which the machine is set.

The sequence control unit 17 has its power input shaft 301 provided with a worm 311 to drive a worm gear 312. This gear is mounted on a rotatable countershaft 313, and carries a pinion 314 which meshes with a pair of driven gears 315 and 316. The gears 315 and 316 are each riveted to the outer housing of identical clutches 317 and 318 which are mounted for free rotation on the shafts 319, and 320, respectively. These clutches are individually controlled by the clutch dogs 321 and 322 adapted to be operated by the electrical solenoids 323 and 324 respectively. The clutch dogs 321 and 322 are arranged to releasably engage the clutch stop levers 325 and 326 to engage or disengage the clutches from the shafts 319 and 320. These shafts extend outwardly through bearings in the housing of the unit, and have circular plates 327 and 328 secured to their outer ends. These plates provide a mounting for a pair of lugs 331 and 332, each adapted to strike one of the spring blades 333 or 334 of a rocker fitting comprising a generally vertical lever 335 pivoted to a fixed stud 336 at its upper end. The lower end of the lever 335 engages the operating lever 337 of a single pole, double throw snap switch 338. This switch is energized by the contactor of the turn counting device 20 and its two poles are connected to the solenoid windings 323 and 324 respectively, so that as the lugs 331 and 332 alternately engage the spring blades of the rocker fitting and move it back and forth, the switch 338 will automatically shift back and forth between the solenoids. Thus these solenoids will be alternately energized in response to successive electrical impulses transmitted to this unit from the counting unit 20.

When the solenoid 323 is energized, it will momentarily release the dog 321 to engage the clutch 317 and rotate the shaft 319 through one full revolution before the dog again engages the clutch. Similarly, the solenoid 324 will engage the clutch 318 to drive the shaft 320 through one revolution.

Each of these shafts rotates at the same ratio with respect to the arbors so that a single revolution of either of these shafts will represent a corresponding number of turns of the winding of the condenser. If a ratio of forty to one is used (as has been found convenient on the machines as now manufactured) it will be seen that if the turn counter 20 is set for more than forty turns each shaft will come to a stop before the other begins to turn, but if the counting unit is set for less than forty turns the shaft 320 will begin to rotate before the shaft 319 completes its movement so that they both move together but with the first leading the other by an angular distance representing the number of turns for which the counter is set.

The shafts 319 and 320 co-act to drive a sequence control drum 341 which actuates the electrical switches controlling the sequence of operations of the entire machine, but the drum is driven from these shafts by self-disengaging ratchets, so that it moves only during the first few and last few turns of each winding. The exact number of turns may be adjusted as desired, but it has been found expedient to rotate the drum during the first six turns of each winding to time the operations of the air cylinder 191, and through the last fourteen turns to time the solenoids 199 and 256.

The drum 341 is mounted on a rotatable shaft 342 carried in bearings 343 and 344 above and between the shafts 319 and 320. As shown in the drawings, the mechanism includes six adjustable cams, since in certain modified uses of the unit this number is utilized, but in the form of the machine here described only four cams are required. These cams 345, 346, 347 and 348 are clamped between the spacers 349 by a lock nut 351 threaded on the end of the shaft 342, and each cam is individually set to operate one of the switches 355, 356, 357 and 358 at predetermined angular positions of rotation of the drum 341. It is obvious, of course, that any one of these switches may be used to control the air valves to the air cylinder 191 and to make and break the circuits to the solenoids 149 and 256, but for purposes of convenience in this disclosure it will be assumed that the switches 355 and 356 actuate the air valves to extend and withdraw the piston in the air cylinder respectively, while the switch 357 serves to energize the solenoid 149 and the switch 358 energizes the solenoid 256.

As previously stated, the driving connections between the shafts 319 and 320 and the timing drum 341 are made through a pair of self-disengaging clutches, so that the drum moves only during the initial and final few turns. Thus the rotation of the timing drum 341 will not be continuous in any case except when the machine is set to wind condensers of the minimum number of turns within its range of adjustment. In all larger sizes the timing drum will operate for a few turns only at the start of the winding to close the switches 355 and 356 to extend and then withdraw the piston rod of the air cylinder 191, after which it will stop to permit any desired number of turns to be wound on the arbors. The air cylinder 191 functions to perform the operations incident to starting the winding, and the timing drum then comes to a stop until the winding reaches a predetermined number of turns from the end, when it again begins to rotate, first closing the switch 358 to energize the solenoid 256 and score and break the foil, and then closing the switch 257 to energize the solenoid 149 and advance the arbor. To this end the shafts 319 and 320 are provided with cranks 361 and 362 keyed to the shafts; these cranks carry levers 363 and 364, each adapted to engage a single tooth ratchet 365 or 366 secured to the spur gears 367 and 368, respectively. The forward ends of each of the levers 363 and 364 are urged inwardly into engagement with the ratchets 365 and 366, respectively, by springs (not shown) but the levers are also provided with automatic release cams 371 and 372 arranged to coact with cam follower rollers 373 and 374 so that as the rollers strike the stationary cam surfaces the levers will be disengaged from driving connection with their respective ratchets. The two spur gears 367 and 368 are both in mesh with a common driven gear 375 mounted on the rotatable shaft 342 which carries the timing drum 341, and the clutch parts are secured on the shaft in an angular relationship such that the lever 364 engages its ratchet 366 and begins rotation of the timing drum several turns before the clutch stop 326 approaches and is disengaged by the solenoid dog 322, but the lever 362 remains in engagement with its ratchet 365 to continue the motion of the timing drum until the roller 373 engages the cam 371 to disengage the lever from the ratchet.

Thus the motion of the timing drum 341 is intermittent, so that as the end of the winding approaches the drum will begin its movement to actuate the switch 358 to score and sever the foil and then close the switch 357 to advance the upper arbor prior to the operation of the cutoff knife; but the drum will continue to rotate for the first few turns of the next succeeding winding during which time the cams 345 and 346 will actuate the switches 355 and 356 to start the rotation of the arbor and beginning the orbital movement of the turret. After the driving connection of the timing drum is disengaged by the cam 371 and roller 373, the winding of the condenser may continue for any specified number of turns, governed by setting of the turn counting unit 20.

*The automatic speed control*

The sequence control unit 17 also includes acceleration and deceleration control devices so that the speed of operation of the machine is held in the highest practicable level at all times and, more important, is precisely controlled so that a high rate of acceleration and deceleration are accomplished without imposing undue strains on the web of the condenser. In this connection it may be mentioned that the applicant has learned that, for highest production consistent with dependable operation, it is undesirable to permit the arbor to accelerate and decelerate by the normal function of the driving mechanism or by the use of conventional braking devices. On the contrary, best results appear to be attained only when the speed of rotation of the winding arbor be governed according to a predetermined formula which departs from the commonly accepted prior teaching that the speed should be constantly increased during the first half of the winding until it reaches its maximum and decreased correspondingly from that point to the end of the winding. Studies of the applicant have indicated that increased production and dependability are attained by the provision of a mechanism wherein the winding speed is uniformly increased over a fixed number of turns at the beginning of the winding and it is thereafter held at a constant rate until shortly before completion of the winding, at which time the speed is uniformly decelerated but at a slower rate than the rate of initial acceleration. Thus it follows that the relative rates of acceleration and deceleration should be the same for either small or large condensers, but should never exceed a fixed maximum. This desideratum presents an additional problem in a winding machine, however, since while the machine should be able to reach a maximum speed for large condensers it should nevertheless be able to maintain the same speed formula on coils too small to permit reaching full speed. These conflicting considerations are reconciled in the present teachings, however, since the rate of acceleration and deceleration of the winding arbors is governed by speed control devices that control the speed for a fixed number of turns at the beginning and end of each winding, and thus make the machine suited to manufacture of either small or large capacities. These devices include a pair of speed control cams 381 and 382 which are carried on the outer ends of the shafts 319 and 320, respectively, and engage cam follower rollers 383 and 384 to move a bell crank 385 backwardly and forwardly in a rocking movement on a pivot shaft 386 carried in bearings 387 and 388 in the housing of the unit. The bell crank 385 is connected to the speed reducer 15 by downwardly extending link 390 so that the effective gear ratio between the power input shaft 19 and power output shaft 21 is directly controlled in accordance with the angular position of the bell crank 385 on its pivot. A manually operable speed control lever 391 is secured to the bell crank and extends through a slot 392 in the front panel of the cabinet so that the machine speed may be manually set, if desired, but in the normal operation of the machine the speed is automatically controlled by the control cams 381 and 382. These cams are angularly positioned on the shafts 319 and 320, respectively, in such a manner that the output shaft 21 of the speed changer is rotating at its minimum speed when the cam 345 actuates the switch 355 to initiate rotation of the upper arbor. The cam 381 then bears against the cam follower roller 383 to increase the speed in a precisely regulated curve for the first few turns of the coil. This will be until the maximum speed ratio is reached in a condenser of forty turns or over, but in a condenser of less than forty turns the speed reducing cam 382 will engage the follower roller 384 before full speed is reached, and will decelerate the machine at the desired rate. On a condenser of over forty turns the shaft 320 does not begin its rotation until some time after the shaft 319 has completed its full revolution, so that the unit continues to rotate at maximum speed until the coil approaches the desired number of turns. The rotation of shaft 320 then causes the cam 382 to bear against the cam follower 384 and reduce the operating speed of the unit during the final turns of the winding, so that it is again rotating at minimum speed when the arbor advances and is ready to start a new winding.

Threading the paper and foil

To prepare the machine for operation, reels of paper and foil are positioned on the spindles in accordance with the characteristics of the condensers desired. As shown, the condenser consists of two strips of foil and four strips of dielectric paper, and the machine is accordingly provided with the paper reels P1, P2, P3 and P4 and foil reels F1 and F2 at the locations indicated in Figure 1. The reel F1 is placed in a position where its foil strip may be fed between the paper from the reels P1 and P2, while the foil reel F2 is similarly positioned with respect to the paper reels P3 and P4. The paper from all the reels is brought together with all of the paper layers superimposed directly on each other, but one layer of foil is offset in one direction and the other foil strip oppositely offset, so that when the winding of the condensers is completed one of its plates extends beyond the dielectric at each end of the coil. The terminals may thus be conveniently affixed to the foil, and the inner edge of each foil strip is thus spaced away from the edge of the paper. The entire web passes between the idler rollers 39 and is drawn downwardly alongside the guide bar 60 and around the tail stock support 85 of the turret. The machine is now ready for operation.

Operation

Figure 1:
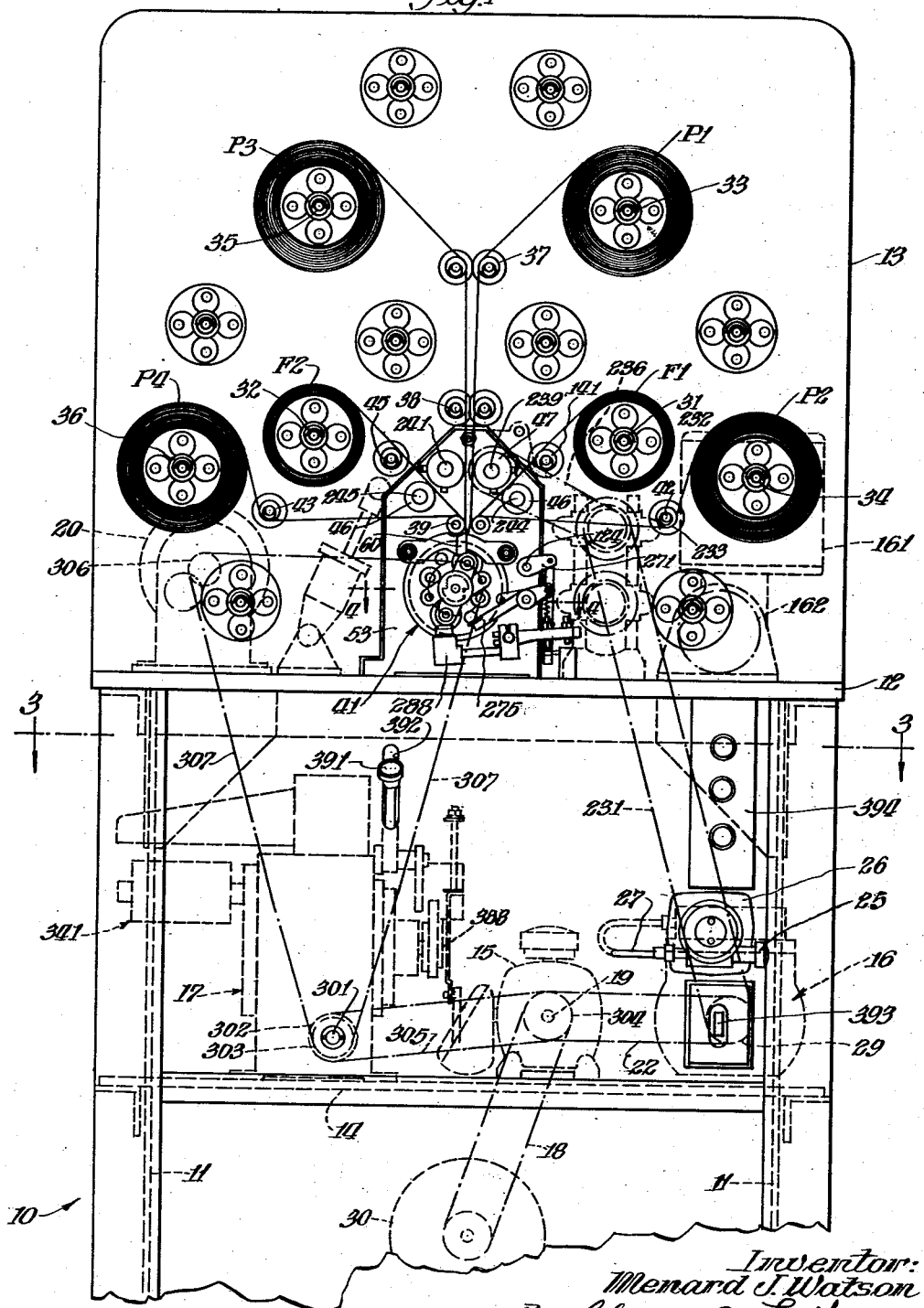
Figure 1 is a front elevational view of a condenser winding machine according to these teachings.

The operation of the machine is initiated by closing the electrical switch 393 and actuating a pushbutton on the starting box 394 of a motor control system which may be of conventional design but which serves to energize the main driving motor 30 and the motor driven speed reducer unit 161 (Fig. 1). The motor 30 operates through the belt 18 to deliver power to the input shaft 19 of the automatic speed reducer 15 and the output shaft on the opposite end of this reducer drives the chains 22 and 305 which energize the speed changer 16 and the speed and timing control unit 17, respectively.

The output of the speed changer 16 is transmitted from its sprocket 29 upwardly through a chain 231 to the countershaft 233 and thence through the chain 236 to the clutch 238 on the shaft 239 of the roller 47, and since all of the four rolls 46 and 47 are geared together, these will be driven intermittently whenever the clutch 238 is engaged.

The drive from the speed reducer 15 to the speed and timing control unit 17 also serves to provide power for rotating the arbors and operating the coil counting unit 20, since the power input shaft 391 of the unit 17 also carries a sprocket 303 from which the chain 307 extends to the sprocket 104 at the back of the turret and the sprocket 306 on the coil counting unit 20.

It will be understood, of course, that since the normal operation of the machine is continuous, its sequence of operative steps will begin at any point in its operation at which it was last stopped and the various parts will function in the manner described in greater detail in the earlier portions of this disclosure, but assuming that the parts are in positions shown in Figures 1 to 6, inclusive, where they are ready to start the winding of a condenser, the sequence of operations may be briefly traced as follows: the rotation of the sequence control drum 341 on the timing and speed control 17 will cause the cam operated switches to advance the upper winding arbor across the web, begin rotation of the arbor, and simultaneously operate the cutoff knife and glue applicator, while the accelerating speed control cam 381 is holding the automatic speed changer at minimum speed. The rotation of the cam 381 effects a rapid but smooth acceleration of the arbor speed until maximum speed is reached or until deceleration cam 382 engages its follower. Thus the winding speed increases as the turret is released for indexing movement and begins to carry the arbor around to the lower station, and, in a large condenser, the arbor continues to rotate at maximum speed for a period determined by the setting of the coil counting mechanism 20. In any case, the speed reducing cam 382 engages its follower 384 a few turns from the end of the coil to decelerate the speed of the winding as the condenser is completed. The timing drum 341 actuates switches to start and stop the foil scoring and severing rolls during this period of deceleration prior to cutting off the paper web.

When the web is about to be cut and a new winding started on the upper arbor, the condenser on the lower arbor is brought into contact with the glue applicator just before the paper is severed, so that the final turns of the leading condenser are wound after the following winding has been started. Also, the outer coils of this condenser are adhesively sealed after the next winding has begun. The condenser remains on the pins of the arbor until the next indexing movement is started, after which the arbor is withdrawn into the arbor sleeve of the turret and the thin stripping plate between the arbor pins strips the condenser from the pins and allows it to drop into a receptacle provided for the finished product. The spring arm 70 extends across the path of movement of the arbor so that in the event that a condenser should stick to the stripping plate it would be positively dislodged before the arbor reaches its upper station.

From the foregoing it will be seen that the teachings of this disclosure accomplish important practical advantages over machines previously known in several respects. In the first place, the improved foil handling mechanisms here disclosed make possible the automatic winding of condensers in rapid succession, yet maintain extremely thin and flexible strips of foil and paper in a condition where they are supported under moderate tension at all times so that the leading edges of the foil are never unsupported but are positively drawn into the condenser coil on each operation. This avoids tangling and buckling of the foil and facilitates rapid engagement of the arbor with the foil web so that the successive windings may be produced with the greatest rapidity. In addition, it is noted that although the machine utilizes only one condenser web, yet the successive steps of operation of the machine overlap to a substantial extent, so that the winding operation is not only continuous, but, in fact, so that one winding begins somewhat before the completion of the one preceding it. It is not only unnecessary for the machine to have a period of idleness while the outer coils of the condenser are glued in place or while the finished condenser is stripped from the winding arbor, but time is saved by winding the last coils of one winding and the first coils of the next at the same time.

In addition to the foregoing advantages the mechanism includes automatic speed control devices whereby the acceleration and deceleration of the winding coil are positively controlled according to a speed curve determined to produce the maximum output consistent with dependable operation, yet this is accomplished without sacrifice of flexibility in the machine, and the machine can be set to wind condensers of several or many turns without change in adjustment of the acceleration and deceleration control mechanisms. In short, it is submitted that the teachings of this disclosure result in an improved winding machine capable of dependable operation and of far greater production than machines heretofore known, yet so designed that it requires no attention other than the replacement of the reels of paper and foil.

The form of the invention shown in the drawings and described herein is the present commercial embodiment of these teachings and is believed to be particularly well suited to a description of the principles involved, but it is recognized that various modifications and structural changes may be indulged in without departing from the inventive concept and without sacrifice of all of its advantages and it is accordingly pointed out that the scope of the inventive thought is not limited to the precise structure shown but extends to any variation or modification thereof within the terms of the appended claims.

Having thus described the invention, what I claim as new and desire to protect by United States Letters Patent is:

1. In a condenser winding machine, including a plurality of paper supply reels and a plurality of foil supply reels with feeding mechanisms to interleave the webs of paper and foil from said reels; the combination of a plurality of winding arbors; means to engage an arbor with the condenser web; means to increase the speed of rotation of said arbor uniformly over a fixed number of turns of its rotation at the beginning of the windings; means to rotate the arbor at a relatively constant maximum speed over a number of revolutions in accordance with the capacity of the condenser being wound; means to decrease the speed of rotation of the arbor at a predetermined rate over a fixed number of revolutions at the end of the winding; means to advance the arbor in orbital movement during its rotation to draw the condenser web in a taut span across a following arbor; means to engage the following arbor with the web prior to completion of the winding of the first arbor, means while the first arbor is rotating and rotatable in the direction of feed of the foil and substantially at the same speed as the latter, to score the foil, means to separate the foil at the scored portion, and means to sever the paper web and to initiate rotation of the following arbor.

2. In a condenser winding machine, including a plurality of paper supply reels and a plurality of foil supply reels with feeding mechanisms to interleave the webs of paper and foil from said reels, together with a winding arbor and means to engage the arbor with the condenser web; the combination of a variable ratio speed changer to govern the speed of the winding arbor, with means, including a shiftable cam to actuate the speed changer, to increase the speed of rotation of said arbor uniformly over a fixed number of turns of its rotation at the beginning of the winding and to rotate the arbor at a relatively constant maximum speed over a number of revolutions in accordance with the capacity of the condenser being wound; and means, including a second cam to actuate the speed changer, to decrease the speed of rotation of the arbor at a predetermined rate over a fixed number of revolutions at the end of the winding.

3. In a condenser winding machine, including at least one winding arbor with a plurality of dielectric supply reels and foil supply reels, and feeding mechanisms to interleave the dielectric layers and foil from said reels into a condenser web; the combination of mechanical means rotatable in the direction of feed of the foil and substantially at the same speed as the latter and adapted to press against the foil to score the latter at a point remote from the winding arbor; means to feed a predetermined length of foil from the scoring means toward the winding arbor to advance the scored portion of the foil into interleaved relation with the dielectric layers, and means to grasp the foil intermediate the supply reel and winding arbor to effect a separation thereof at the scored portion.

4. In a condenser winding machine, including at least one winding arbor with a plurality of dielectric supply reels and foil supply reels, and feeding mechanisms to interleave the dielectric layers and foil from said reels into a condenser web; the combination of mechanical means rotatable in the direction of feed of the foil and substantially at the same speed as the latter and adapted to press against the foil to score the latter at a point remote from the winding arbor; means to feed a predetermined length of foil from the scoring means toward the winding arbor to advance the scored portion of the foil into interleaved relation with the dielectric layers, means carried by said rotatable mechanical means and movable into engagement with the foil to grasp the latter intermediate the supply reel and winding arbor to effect a separation thereof at the scored portion whereby the leading edge of the foil will be supported by and in frictional engagement with the dielectric layers; means to advance the dielectric layers to provide a space between the ends of the foil, means to engage the web with a winding arbor and to thereafter sever the dielectric layer between the ends of the foil and to initiate the winding of a new coil, means simultaneously to move the grasping means out of engagement with the foil and to draw it momentarily forwardly from the reel whereby the frictional engagement between the foil and dielectric will draw the foil into the coil of the next condenser.

5. In a condenser winding machine, including at least one winding arbor with a plurality of dielectric supply reels and foil supply reels, and feeding mechanisms to interleave the dielectric layers and foil from said reels into a condenser web; the combination of mechanical means rotatable in the direction of feed of the foil and substantially at the same speed as the latter and adapted to press against the foil to score the latter at a point remote from the winding arbor; means to feed a predetermined length of foil from the scoring means toward the winding arbor to advance the scored portion of the foil into the interleaved relation with the dielectric layers, means carried by said rotatable mechanical means and movable into engagement with the foil to grasp the latter intermediate the supply reel and winding arbor to effect a separation thereof at the scored portion, and means simultaneously to move the grasping means out of engagement with the foil and to draw it momentarily forwardly from the reel whereby the frictional engagement between the foil and the dielectric layers will draw the foil into the coil of the next condenser.

6. In a condenser winding machine, adapted to wind plural layers of metal foil and insulating material into a compact coil, the combination of mechanical means comprising a pair of rollers including a resilient roller and a coacting roller carrying a crimping bar having a plurality of teeth spaced apart thereon to score the foil at a point remote from the winding arbors; said pair of rollers also including means to grasp the foil intermediate the supply reel and winding arbor to effect a separation thereof; means to thereafter cut the dielectric layer, and means to simultaneously release the grasp on the foil, urge the foil forwardly from the reel, and initiate rotation of the arbor to begin winding the next condenser.

7. In a condenser winding machine, a foil scoring and severing device including a pair of rolls spaced apart from each other, with scoring projections on one roll adapted to impinge and weaken a sheet of foil moving between the rolls and a segmental projection on at least one roll to grasp the foil and momentarily halt its movement, and to draw it from the supply reel as movement is resumed; together with means to rotate the rolls, and means to interrupt their movement at a predetermined angular position.

8. In a condenser winding machine including a plurality of paper supply reels and a plurality of foil supply reels with feeding mechanisms to interleave the layers of paper and foil from said reels into a condenser web; the combination of at least two winding arbors to wind condensers from the same web, means to engage each arbor with the web as the winding of the leading arbor progresses and prior to separation of the web from the preceding arbor, means while the first arbor is rotating and rotatable in the direction of feed of the foil and substantially at the same speed as the latter, to score the foil, means to separate the foil at the scored portion and means to sever the paper web and to initiate rotation of the following arbor.

9. In a condenser winding machine including a plurality of paper supply reels and a plurality of foil supply reels with feeding mechanisms to interleave the layers of paper and foil from said reels into a condenser web; the combination of a plurality of shiftable arbors, means to rotate an arbor to wind a condenser thereon, means to advance said arbor in orbital movement to draw a taut span of the paper and foil web into engagement with a following arbor, whereby the following arbor may engage the web as the winding of the leading arbor progresses and prior to separation of the web from the leading arbor, means while the first arbor is rotating and rotatable in the direction of feed of the foil and substantially at the same speed as the latter, to score the foil, means to separate the foil at the scored portion and means to sever the paper web and simultaneously to initiate rotation of the following arbor, and means to thereafter apply adhesive to the end of the web in the leading arbor, whereby continued rotation of the arbors will effect initial winding of one condenser concurrently with gluing of the condenser preceding it.

10. In a condenser winding machine including a plurality of paper supply reels and a plurality of foil supply reels with feeding mechanisms to interleave the webs of paper and foil from said reels; the combination of a plurality of shiftable arbors, means to rotate an arbor to wind a condenser thereon and to move said arbor while it is rotating in orbital movement to draw a taut span of the paper and foil web toward a following arbor, means to effect engagement of said web by the following arbor while the web is in motion, means while the first arbor is rotating and rotatable in the direction of feed of the foil and substantially at the same speed as the latter to score the foil, means to separate the foil at the scored portion and means simultaneously to initiate the winding movement of said following arbor and to sever said paper web while said first arbor is rotating.

11. In a condenser winding machine including a plurality of paper supply reels and a plurality of foil supply reels with feeding mechanisms to interleave the webs of paper and foil from said reels; the combination of a plurality of rotatably shiftable and longitudinally slidable arbors including means to simultaneously rotate an arbor to wind a condenser thereon and to advance a leading arbor in orbital movement to draw a taut span of the paper and foil web into alignment across the end of a following arbor, means to advance the following arbor longitudinally to engage the web means while the first arbor is rotating and rotatable in the direction of the feed of the foil and substantially at the same speed as the latter to score the foil, means to separate the foil at the scored portion and means to sever the paper and to initiate rotation of the following arbor.

12. In a condenser winding machine adapted to wind plural layers of metal foil and dielectric material into a compact coil, the combination of a rotatable turret having a plurality of winding arbors, each comprising a rotatable arbor sleeve having a pair of arbor pins longitudinally shiftable therein; means while one of said arbors is rotating to wind a condenser thereupon to rotate the turret to a predetermined position to draw a taut span of a condenser web from said first arbor across the pins of second arbor; means for longitudinally advancing the arbor pins of the second arbor to engage the condenser web; means while the first arbor is rotating and rotatable in the direction of feed of the foil and substantially at the same speed as the latter to score the foil, means to separate the foil at the scored portion, means to sever the paper web and to initiate rotation of the second arbor, means to retract the arbor pins into the arbor sleeve, and means to strip the condenser coil from said pins.

13. In a condenser winding machine, including a plurality of paper supply reels and a plurality of foil supply reels with feeding mechanisms to interleave the webs of paper and foil from said reels; the combination of a rotatable arbor turret, including power actuated driving means for the turret and a releasable indexing stop, whereby the turret may be advanced in step-by-step rotation; a pair of winding arbors each including a longitudinal slot open at one end with means for rotating each of said arbors; and additional means for longitudinally shifting each of said arbors between an operating position, wherein the slot of the arbor extends out of the turret, and an inoperative position wherein the arbor is drawn into the turret.

References Cited in the file of this patent

UNITED STATES PATENTS

| Number | Name | Date |
|---|---|---|
| 2,205,171 | Kile et al. | June 18, 1940 |
| 2,285,229 | Roberts et al. | June 2, 1942 |
| 2,333,570 | Hild | Nov. 2, 1943 |
| 2,340,340 | Nordberg | Feb. 1, 1944 |
| 2,384,983 | Weiss | Sept. 18, 1945 |